(12) United States Patent
Lee et al.

(10) Patent No.: US 11,893,270 B2
(45) Date of Patent: Feb. 6, 2024

(54) STORAGE DEVICE, AND HOST-STORAGE SYSTEM INCLUDING THE STORAGE DEVICE

(71) Applicant: SAMSUNG ELECTRONICS CO., LTD., Suwon-si (KR)

(72) Inventors: Hyuk Lee, Seongnam-si (KR); In Soon Jo, Hwaseong-si (KR); Joo Young Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 17/810,323

(22) Filed: Jun. 30, 2022

(65) Prior Publication Data

US 2023/0153017 A1    May 18, 2023

(30) Foreign Application Priority Data

Nov. 12, 2021    (KR) .................. 10-2021-0155301

(51) Int. Cl.
G06F 3/06    (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 7,546,483 | B1 | 6/2009 | Overby et al. |
| 8,626,820 | B1 | 1/2014 | Levy |
| 9,940,196 | B2 | 4/2018 | Fore et al. |
| 10,244,053 | B2 | 3/2019 | Bestler et al. |
| 10,725,865 | B2 | 7/2020 | Okada et al. |

(Continued)

FOREIGN PATENT DOCUMENTS

| | | |
|---|---|---|
| CN | 10908600 | 12/2018 |
| JP | 2011221981 | 11/2011 |
| KR | H09258911 | 10/1997 |

(Continued)

OTHER PUBLICATIONS

Repair pipelining for erasure-coded storage / R. Li, X. Li, P. P. Lee and Q. Huang / 2017 USENIX Annual Technical Conference (USENIX ATC 17).

(Continued)

*Primary Examiner* — Charles J Choi
(74) *Attorney, Agent, or Firm* — F. CHAU & ASSOCIATES, LLC

(57) ABSTRACT

A storage device includes a non-volatile memory that stores a first original data and a first parity data, a storage controller that receives a second original data that differs from the first original data from an external storage device, and receives the first parity data from the non-volatile memory, and a computational engine that receives and computes the first parity data and the second original data from the storage controller, and restores a third original data that differs from the first original data and the second original data, wherein the storage controller receives the third original data from the computational engine and transmits the third original data to the host and the external storage device.

20 Claims, 20 Drawing Sheets

(56) References Cited

U.S. PATENT DOCUMENTS

2017/0242752 A1* 8/2017 Lee .................. G06F 3/0689
2021/0159914 A1 5/2021 Nowoczynski

FOREIGN PATENT DOCUMENTS

| KR | 1020150121502 | 10/2015 |
| KR | 1020180008219 | 1/2018 |
| KR | 1020200085519 | 7/2020 |
| KR | 1020200116808 | 10/2020 |

OTHER PUBLICATIONS

High Performance Erasure Coding for Very Large Stripe Sizes / W. Haddock, M. Curry, A. Skjellum / SpingSim-HPC, Apr. 29-May 2, 2019. Tucson, AZ, USA.
Designing High-Performance Erasure Coding Scherres for Next-Generation Storage Systems / H. Shi, X. Lu / The International Conference for Hight Performance Computing, Networking, Storage and Analysis (Super Computing 19).
Towards In-network Acceleration of Erasure Coding / Y. Qiao, X. Kong, M. Zhang, Y. Zhou, M. Xu, J. Bi / SOSR '20: Symposium on SDN Research, San Jose CA USA Mar. 3, 2020.

* cited by examiner

FIG. 14

| XOR("+") | X1(=1) | X2(=1) | X3(=0) | X4(=1) |
|---|---|---|---|---|
| X1(=1) | 0 | 0 | 1 | 0 |
| X2(=1) | 0 | 0 | 1 | 0 |
| X3(=0) | 1 | 1 | 0 | 1 |
| X4(=1) | 0 | 0 | 1 | 0 |

⬇ CE XOR Countation

| XOR | X1(=1) | X2(=1) | X3(=0) | X4(=1) |
|---|---|---|---|---|
| X1+X2(=0) | 1(=X2) | 1(=X1) | - | - |
| X1+X3(=1) | 0(=X3) | - | 1(=X1) | - |
| X1+X4(=0) | 1(=X4) | - | - | 1(=X1) |
| X2+X3(=1) | - | 0(=X3) | 1(=X2) | - |
| X2+X4(=0) | - | 1(=X4) | - | 1(=X2) |
| X3+X4(=1) | - | - | 1(=X4) | 0(=X3) |

STORAGE DEVICE, AND HOST-STORAGE SYSTEM INCLUDING THE STORAGE DEVICE

CROSS-REFERENCE TO RELATED APPLICATION

This application claims priority under 35 U.S.C. § 119 from Korean Patent Application No. 10-2021-0155301, filed on Nov. 12, 2021 in the Korean Intellectual Property Office, the contents of which are herein incorporated by reference in their entirety.

TECHNICAL FIELD

Embodiments of the present disclosure are directed to a storage device, and to a host-storage system that includes the storage device.

DISCUSSION OF THE RELATED ART

When storing data, an erasure code stores not only an original data but also additional parity data, thereby enabling the original data to be restored when some of the original data is lost in a part of a storage device.

On the other hand, in many erasure codes used for existing RAID (Redundant Array of Independent Disk) and the like, a host generally performs a decoding computation, which may have several side effects. For example, the host may perform the computation by reading the remaining original data and parity data to restore the original data when a data is lost in a part of the storage device. However, excessive computational resources of the host may be used in this process. This can degrade bandwidth and latency of an overall system.

On the other hand, recently, due to computational storage devices that can perform computations, the storage device may autonomously perform the computation previously performed by the host as described above, thereby reducing the burden on the host. However, due to the characteristics of the erasure code, the computation might not be able to be performed only on the stored data by one storage device, and a data exchange between a plurality of storage devices may be needed. When the computed or stored data inside a computational storage device is exchanged between computational storage devices in a peer-to-peer (P2P) system, the overhead of the network may increase.

SUMMARY

Embodiments of the present disclosure provide a storage device that can perform a decoding method that utilizes computational resources inside a storage device, without using computational resources of the host.

Embodiments of the present disclosure also provide a host-storage system that can perform a decoding method that utilizes the computational resources inside the storage device, without using the computational resources of the host.

According to an embodiment of the present disclosure, there is a provided storage device that includes a non-volatile memory that stores a first original data and a first parity data, a storage controller that receives a second original data that differs from the first original data from an external storage device, and receives the first parity data from the non-volatile memory, and a computational engine that receives and computes the first parity data and the second original data from the storage controller, and restores a third original data that differs from the first original data and the second original data, wherein the storage controller receives the third original data from the computational engine and transmits the third original data to the host and the external storage device.

According to another embodiment of the present disclosure, there is a provided storage device that includes a first storage device that stores a first original data of an original data set that includes the first original data to a fourth original data and a first parity data, and a second storage device that stores the second original data and a second parity data that differs from the first parity data, wherein the first storage device computes the second original data received from the second storage device and the first parity data, and restores the third original data, and wherein the second storage device transmits the second original data simultaneously to the first storage device and a host.

According to another embodiment of the present disclosure, there is a provided host-storage system that includes a host, a storage device that includes a first storage device that stores a first data and a second storage device that stores a second data, and a host interface that connects the host and the storage device, wherein the host transmits a read command to the first storage device and the second storage device, wherein the first storage device transmits a third data that is at least a part of the first data simultaneously to the host and the second storage device in response to the read command, and wherein the second storage device executes a computation that uses the third data received from the first storage device and the second data.

BRIEF DESCRIPTION OF DRAWINGS

FIG. 14 illustrates a method for performing a decoding computation by a computing engine based on an erasure code according to an embodiment.

DETAILED DESCRIPTION

Hereinafter, embodiments according to a technical idea of the present disclosure will be described with reference to the accompanying drawings.

Figure 1:
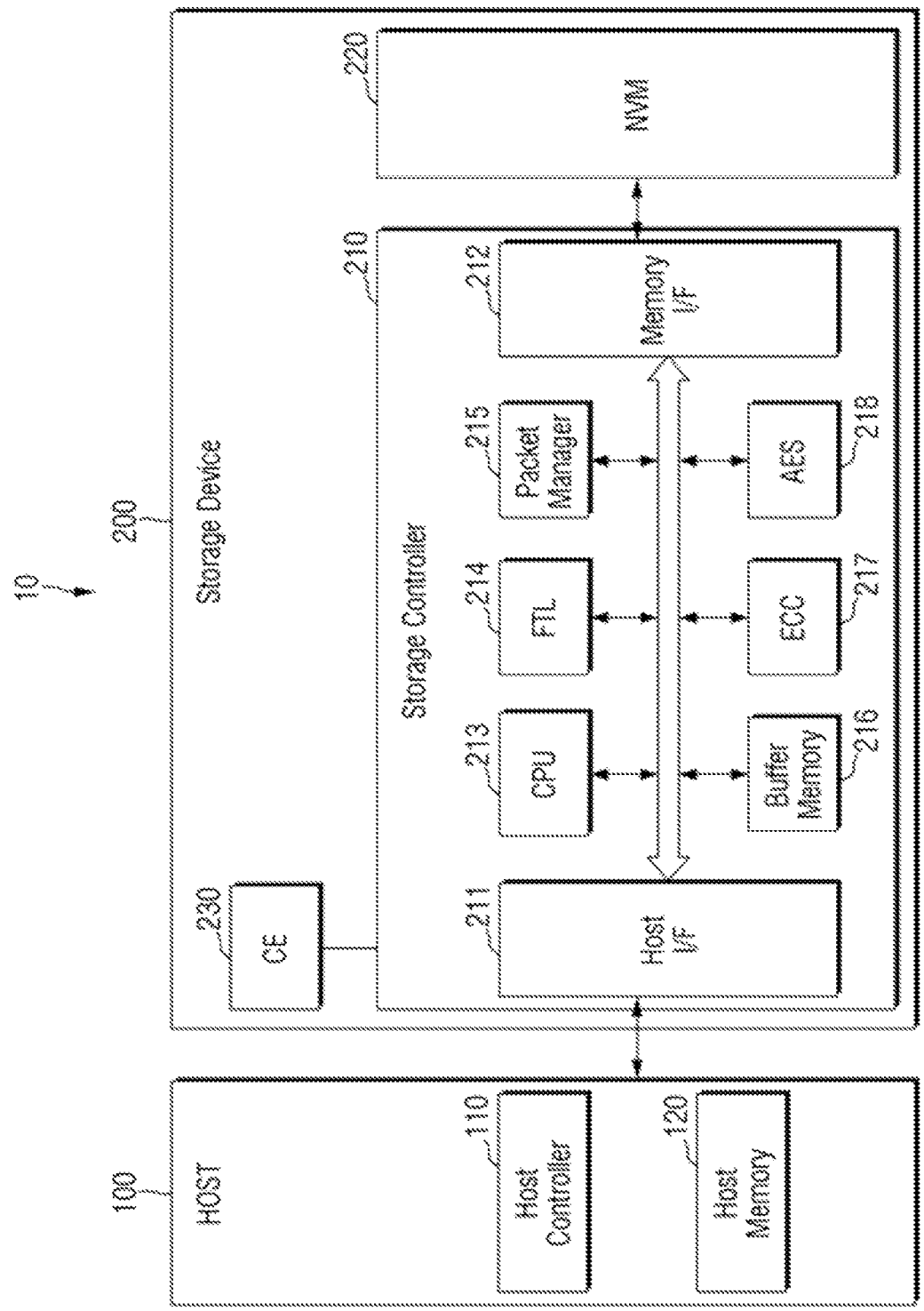
FIG. 1 is a block diagram of a host-storage system according to some embodiments.

FIG. 1 is a block diagram of a host-storage system according to some embodiments.

In some embodiments, a host-storage system 10 includes a host 100 and a storage device 200. The storage device 200 includes a storage controller 210, a non-volatile memory (NVM) 220 and a computational engine (CE) 230. Further, in some embodiments, the host 100 includes a host controller 110 and a host memory 120. The host memory 120 functions as a buffer memory that temporarily stores data to be transmitted to the storage device 200 or data received from the storage device 200.

The storage device 200 includes storage medium that stores data in response to a request from the host 100. For example, the storage device 200 includes at least one of a Solid status Drive (SSD), an embedded memory, or a detachable external memory. When the storage device 200 is an SSD, the storage device 200 may be, for example, a device that complies with the non-volatility memory express (NVMe) standard.

When the storage device 200 is an embedded memory or an external memory, the storage device 200 complies with the UFS (universal flash storage) or the eMMC (embedded multi-media card) standards. The host 100 and the storage device 200 each generate and transmit packets according to the adopted standard protocol.

When the non-volatile memory 220 of the storage device 200 includes a flash memory, the flash memory may include a 2D NAND memory array or a 3D (or vertical) NAND (VNAND) memory array. For example, the storage device 200 may include various different types of non-volatile memories. For example, the storage device 200 may include a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), and/or various other types of memories.

In some embodiments, the host controller 110 and the host memory 120 are implemented as separate semiconductor chips. Further, in some embodiments, the host controller 110 and the host memory 120 are integrated on the same semiconductor chip. For example, the host controller 110 may be one of a plurality of modules provided in an application processor, and the application processor may be implemented as a system on chip (SoC). Further, the host memory 120 may be an embedded memory provided inside the application processor, or a non-volatile memory or a memory module placed outside the application processor.

The host controller 110 manages an operation of storing data, such as write data, of a buffer region in the non-volatile memory 220 or storing data, such as read data, of the non-volatile memory 220 in the buffer region.

The storage controller 210 includes a host interface 211, a memory interface 212, and a central processing unit (CPU) 213. In addition, the storage controller 210 furthers include a flash translation layer (FTL) 214, a packet manager 215, a buffer memory 216, an error correction code (ECC) engine 217, and an advanced encryption standard (AES) engine 218.

The storage controller 210 further includes a working memory into which the flash translation layer (FTL) 214 is loaded, and when the CPU 213 executes the flash translation layer 214, the data write and read operations of the non-volatile memory can be controlled.

The host interface 211 transmits and receives packets to and from the host 100. The packets transmitted from the host 100 to the host interface 211 may include a command or data to be written to the non-volatile memory 220, etc. The packets transmitted from the host interface 211 to the host 100 may include a response to the command or data that is read from the non-volatile memory 220, etc.

The memory interface 212 transmits data to be written to the non-volatile memory 220 to the non-volatile memory 220 or receives data that is read from the non-volatile memory 220. The memory interface 212 may be implemented to comply with standard protocols such as Toggle or ONFI.

The flash translation layer 214 performs various functions such as address mapping, wear-leveling, and/or garbage collection. Address mapping operation changes a logical address received from a host into a physical address that is used to actually store the data in the non-volatile memory 220. Wear-leveling ensures that blocks in the non-volatile memory 220 are used uniformly to prevent excessive degradation of a particular block, and may be implemented, for example, through a firmware technique that balances erasure counts of the physical blocks. Garbage collection ensures the available capacity in the non-volatile memory 220 by copying valid data of an existing block to a new block and then erasing the existing block.

The packet manager 215 may generate a packet according to the protocol of the interface discussed with the host 100, or may parse various types of information from the packet received from the host 100. Further, the buffer memory 216 temporarily stores the data to be written to the non-volatile memory 220 or the data being read from the non-volatile memory 220. The buffer memory 216 may be configured to be provided inside the storage controller 210, or may be placed outside the storage controller 210.

An ECC engine 217 performs error detection and correction functions on the read data that is read from the non-volatile memory 220. More specifically, the ECC engine 217 generates parity bits for the write data to be written to the non-volatile memory 220, and the generated parity bits are stored in the non-volatile memory 220 together with the write data. When reading the data from the non-volatile memory 220, the ECC engine 217 corrects errors in the read data using the parity bits that are read from the non-volatile memory 220 together with the read data, and outputs the corrected read data.

An AES engine 218 performs at least one of an encryption and/or decryption operation on the data which is input to the storage controller 210 using a symmetric-key algorithm.

A computational engine 230 performs computations on the data that are read from the non-volatile memory 220. For example, the computational engine 230 includes a field programmable gate array (FPGA). The computational engine 230 can perform an XOR computation to restore the whole original data when some original data are lost. The specific contents thereof will be described below.

On the other hand, although FIG. 1 shows that the computational engine 230 is not included in the storage controller 210 and is shown as an independent configuration, embodiments of the present disclosure are not necessarily limited thereto, and in other embodiments, the computational engine 230 is included in the storage controller 210.

Further, although FIG. 1 shows that the computational engine 230 receives data stored in the non-volatile memory 220 from the storage controller 210, embodiments of the present disclosure are not necessarily limited to thereto, and in other embodiment, the computational engine 230 receives the stored data from the non-volatile memory 220.

Figure 2:
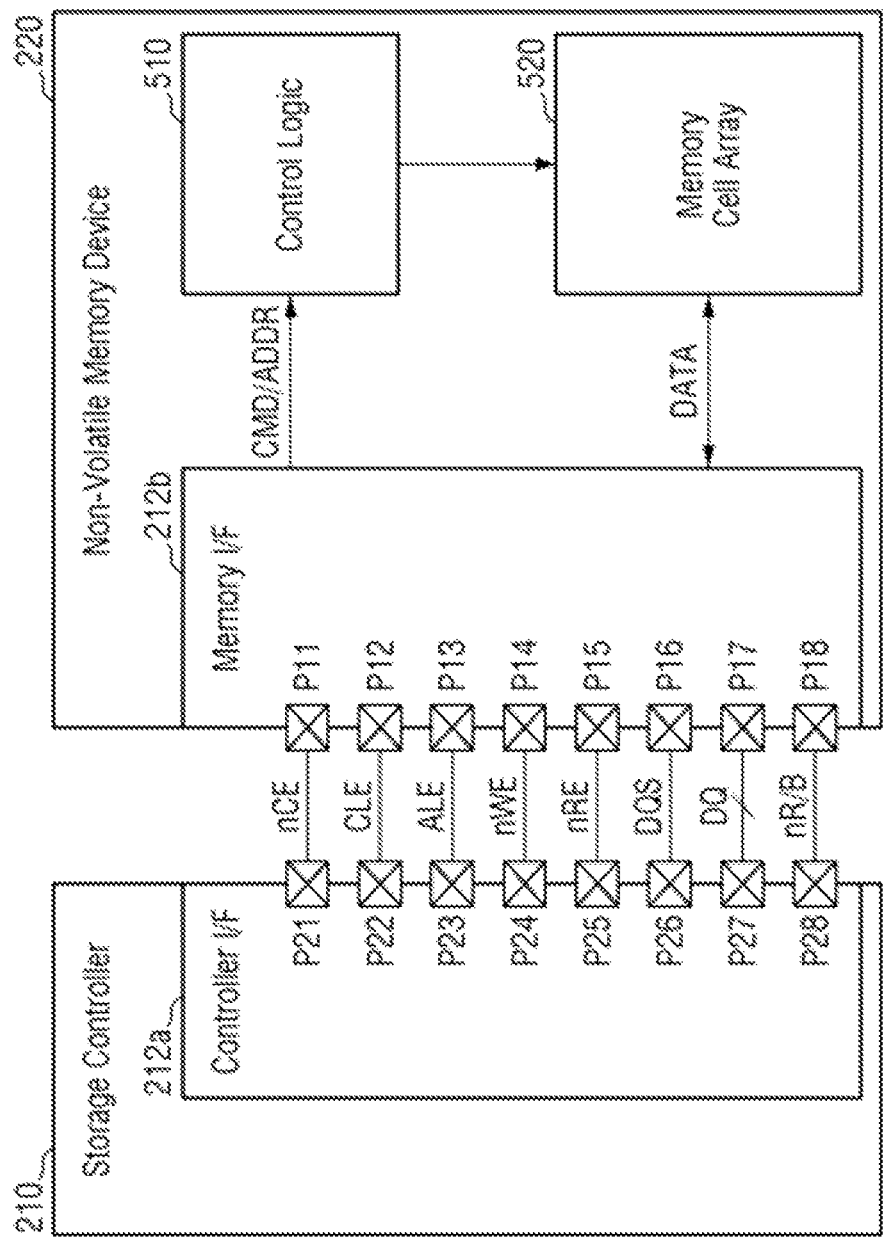
FIG. 2 illustrates a storage controller, a memory interface, and a non-volatile memory of FIG. 1 that have been reconfigured.

FIG. 2 illustrates a storage controller, a memory interface, and a non-volatile memory of FIG. 1 that have been reconfigured.

The memory interface 212 of FIG. 1 has been reconfigured to include a controller interface circuit 212a and a memory interface circuit 212b, as shown in FIG. 2.

The non-volatile memory 220 includes first to eighth pins P11 to P18, a memory interface circuit 212b, a control logic circuit 510, and a memory cell array 520.

The memory interface circuit 212b receives a chip enable signal nCE from the storage controller 210 through a first pin P11. The memory interface circuit 212b transmits and receives signals to and from the storage controller 210 through second to eighth pins P12 to P18 according to the chip enable signal nCE. For example, when the chip enable signal nCE is in an enable status, such as a low level, the memory interface circuit 212b transmits and receives signals to and from the storage controller 210 through second to eighth pins P12 to P18.

The memory interface circuit 212b receives a command latch enable signal CLE, an address latch enable signal ALE, and a write enable signal nWE from the storage controller 210 through the second to fourth pins P12 to P14, respectively. The memory interface circuit 212b receives a data signal DQ from the storage controller 210 or transmits the data signal DQ to the storage controller 210 through a seventh pin P17. The command CMD, the address ADDR, and the data are transmitted through the data signal DQ. For example, the data signal DQ may be transmitted through a plurality of data signal lines. The seventh pin P17 may include a plurality of pins that correspond to the plurality of data signals.

The memory interface circuit 212b acquires the command CMD from the data signal DQ received in an enable section, such as a high level status, of the command latch enable signal CLE on the basis of toggle timings of the write enable signal nWE. The memory interface circuit 212b acquires the address ADDR from the data signal DQ received in the enable section, such as the high level status, of the address latch enable signal ALE on the basis of the toggle timings of the write enable signal nWE.

In some embodiments, the write enable signal nWE holds a static status, such as a high level or a low level, and is then toggled between the high level and the low level. For example, the write enable signal nWE is toggled at a section in which the command CMD or the address ADDR is transmitted. Accordingly, the memory interface circuit 212b acquires the command CMD or the address ADDR on the basis of the toggle timings of the write enable signal nWE.

The memory interface circuit 212b receives a read enable signal nRE from the storage controller 210 through a fifth pin P15. The memory interface circuit 212b receives a data strobe signal DQS from the storage controller 210 or transmits the data strobe signal DQS to the storage controller 210, through a sixth pin P16.

In a data DATA output operation of the non-volatile memory 220, the memory interface circuit 212b receives the toggled read enable signal nRE through the fifth pin P15 before outputting the data DATA. The memory interface circuit 212b generates the toggled data strobe signal DQS on the basis of toggling the read enable signal nRE. For example, the memory interface circuit 212b generates the data strobe signal DQS that starts to toggle after a predetermined delay, such as tDQSRE, on the basis of the toggling start time of the read enable signal nRE. The memory interface circuit 212b transmits a data signal DQ that includes the data DATA on the basis of the toggle timing of the data strobe signal DQS. Accordingly, the data DATA is arranged by the toggle timing of the data strobe signal DQS and transmitted to the storage controller 210.

In a data DATA input operation of the non-volatile memory 220, when the data signal DQ that includes the data DATA is received from the storage controller 210, the memory interface circuit 212b receives the toggled data strobe signal DQS together with the data DATA from the storage controller 210. The memory interface circuit 212b acquires the data DATA from the data signal DQ on the basis of the toggle timing of the data strobe signal DQS. For example, the memory interface circuit 212b acquires the data DATA by sampling the data signal DQ at a rising edge and a falling edge of the data strobe signal DQS.

The memory interface circuit 212b transmits a ready/busy output signal nR/B to the storage controller 210 through an eighth pin P18. The memory interface circuit 212b transmits the status information of the non-volatile memory 220 to the storage controller 210 through the ready/busy output signal nR/B. When the non-volatile memory 220 is in a busy status, for example, when the internal operations of the non-volatile memory 220 are being performed, the memory interface circuit 212b transmits the ready/busy output signal nR/B that indicates the busy status to the storage controller 210. When the non-volatile memory 220 is in a ready status, for example, when the internal operations of the non-volatile memory 220 are not being performed or are completed, the memory interface circuit 212b transmits the ready/busy output signal nR/B that indicates the ready status to the storage controller 210.

For example, when the non-volatile memory 220 reads the data DATA from the memory cell array 520 in response to a page read command, the memory interface circuit 212b transmits a ready/busy output signal nR/B that indicates busy status, such as a low level, to the storage controller 210. For example, when the non-volatile memory 220 programs data DATA into the memory cell array 520 in response to a program instruction, the memory interface circuit 212b transmits a ready/busy output signal nR/B that indicates busy status to the storage controller 210.

The control logic circuit 510 generally controls various operations of the non-volatile memory 220. The control logic circuit 510 receives the command/address CMD/ADDR acquired from the memory interface circuit 212*b*. The control logic circuit 510 generates control signals that control other constituent elements of the non-volatile memory 220 according to the received command/address CMD/ADDR. For example, the control logic circuit 510 generates various control signals that program data DATA to the memory cell array 520 or read data DATA from the memory cell array 520

The memory cell array 520 stores data DATA acquired from the memory interface circuit 212*b* according to the control of the control logic circuit 510. The memory cell array 520 outputs stored data DATA to the memory interface circuit 212*b* according to the control of the control logic circuit 510.

The memory cell array 520 includes a plurality of memory cells. For example, the plurality of memory cells may be flash memory cells. However, embodiments of the present disclosure are not necessarily limited thereto, and the memory cells may be a resistive random access memory (RRAM) cell, a ferroelectric random access memory (FRAM) cell, a phase change random access memory (PRAM) cell, a thyristor random access memory (TRAM) cell, or a magnetic random access memory (MRAM) cell. Hereinafter, embodiments of the present disclosure will be described on the basis of an embodiment in which the memory cells are NAND flash memory cells.

The storage controller 210 include first to eighth pins P21 to P28, and a controller interface circuit 212*a*. The first to eighth pins P21 to P28 respectively correspond to the first to eighth pins P11 to P18 of the non-volatile memory 220.

The controller interface circuit 212*a* transmits the chip enable signal nCE to the non-volatile memory 220 through a first pin P21. The controller interface circuit 212*a* transmits and receives signals to and from the non-volatile memory 220, which are selected through the chip enable signal nCE, through the second to eighth pins P22 to P28.

The controller interface circuit 212*a* transmits the command latch enable signal CL E, the address latch enable signal ALE, and the write enable signal nWE to the non-volatile memory 220 through the second to fourth pins P22 to P24, respectively. The controller interface circuit 212*a* transmits the data signal DQ to the non-volatile memory 220 through a seventh pin P27 or receives the data signal DQ from the non-volatile memory 220.

The controller interface circuit 212*a* transmits the data signal DQ that includes the command CMD or the address ADDR, along with a toggled write enable signal, to the non-volatile memory 220. The controller interface circuit 212*a* transmits the data signal DQ that includes the command CMD to the non-volatile memory 220 by transmitting an enable status command latch enable signal CLE, and transmits the data signal DQ that includes the address ADDR to the non-volatile memory 220 by transmitting an enable status address latch enable signal ALE.

The controller interface circuit 212*a* transmits the read enable signal nRE to the non-volatile memory 220 through a fifth pin P25. The controller interface circuit 212*a* receives the data strobe signal DQS from the non-volatile memory 220 or transmits the data strobe signal DQS to the non-volatile memory 220 through a sixth pin P26.

In a data DATA output operation of the non-volatile memory 220, the controller interface circuit 212*a* generates a toggled read enable signal nRE and transmits the read enable signal nRE to the non-volatile memory 220. For example, the controller interface circuit 212*a* generates a read enable signal nRE that changes from a static status, such as a high level or a low level, to toggle status, before the data DATA is output. Accordingly, the toggled data strobe signal DQS is generated in the non-volatile memory 220 on the basis of the read enable signal nRE. The controller interface circuit 212*a* receives the data signal DQ that includes the data DATA together with the toggled data strobe signal DQS from the non-volatile memory 220. The controller interface circuit 212*a* acquires the data DATA from the data signal DQ on the basis of the toggle timing of the data strobe signal DQS.

In a data DATA input operation of the non-volatile memory 220, the controller interface circuit 212*a* generates a toggled data strobe signal DQS. For example, the controller interface circuit 212*a* generates a data strobe signal DQS that changes from a static status, such as a high level or a low level) to toggle status before transmitting the data DATA. The controller interface circuit 212*a* transmits the data signal DQ that includes the data DATA to the non-volatile memory 220 on the basis of the toggle timings of the data strobe signal DQS.

The controller interface circuit 212*a* receives a ready/busy output signal nR/B from the non-volatile memory 220 through an eighth pin P28. The controller interface circuit 212*a* discriminates the status information of the non-volatile memory 220 on the basis of the ready/busy output signal nR/B.

Figure 3:
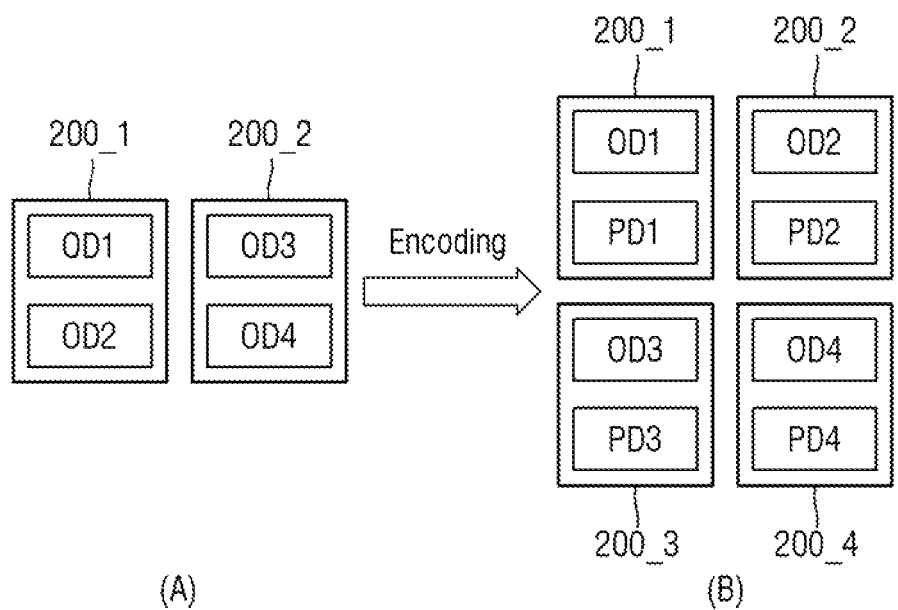
FIG. 3 schematically shows an encoding method that uses an erasure code according to some embodiments.

FIG. 3 illustrates an encoding method that uses an erasure code according to some embodiments.

Referring to FIG. 3, in some embodiments, (A) shows a first storage device 200_1 that stores two original data OD1 and OD2, and a second storage device 2002 that also stores two original data OD3 and OD4. Each of the original data OD1 to OD4 has a size of 1 bit, and the entire data stored in the single storage device may be defined as a data block.

In (A), the size of all original data is 4 bits because there are four original data. However, embodiments are not necessarily limited thereto, and in other embodiments, the size of the whole original data and the size of the data block stored in the single storage device may vary.

An encoding method according to some embodiments stores the generated parity data together with the original data in a plurality of storage devices, while maintaining the whole original data.

Specifically, in (B), additional storage devices are used to store the original data OD1 to OD4 and the additionally generated parity data PD1 to PD4. That is, to store the existing original data OD1 to OD4 and the additionally generated parity data PD1 to PD4, a third storage device 200_3 and a fourth storage device 200_4 are used.

In an encoding process, each of the plurality of storage devices 200_1 to 200_4 evenly distributes and stores the original data OD1 to OD4. Further, each of the plurality of storage devices 200_1 to 200_4 evenly distributes and stores the parity data PD1 to PD4.

Specifically, the first storage device 200_1 stores one original data OD1 and one parity data PD1. The second storage device 200_2 stores one original data OD2 and one parity data PD2. The third storage device 200_3 stores one original data OD3 and one parity data PD3. The fourth storage device 200_4 stores one original data OD and one parity data PD4.

The parity data is data generated by performing an XOR computation on an original data of the whole original data and is used to restore the original data. Specifically, the parity data is generated by performing an XOR computation on two original datas of the entire four original datas so that all the four original datas can be restored even if only two of the four storage devices 200_1 to 200_4 are used.

The respective size of each parity data PD1 to PD4 is 1 bit, which is the same as the respective sizes of the original data OD1 to OD4. Therefore, the size of the data block stored in the plurality of storage devices 200_1 to 2004 is kept as 2 bits before and after encoding.

On the other hand, although FIG. 3 shows that four original data OD1 to OEM that are evenly distributed one by one to each of the four storage devices 200_1 to 2004, embodiments are not necessarily limited thereto. Specifically, when, for example, three original datas exist, new data can be generated through a process such as data padding and can be evenly distributed to the plurality of storage devices 200_1 to 200_4.

Figure 4:
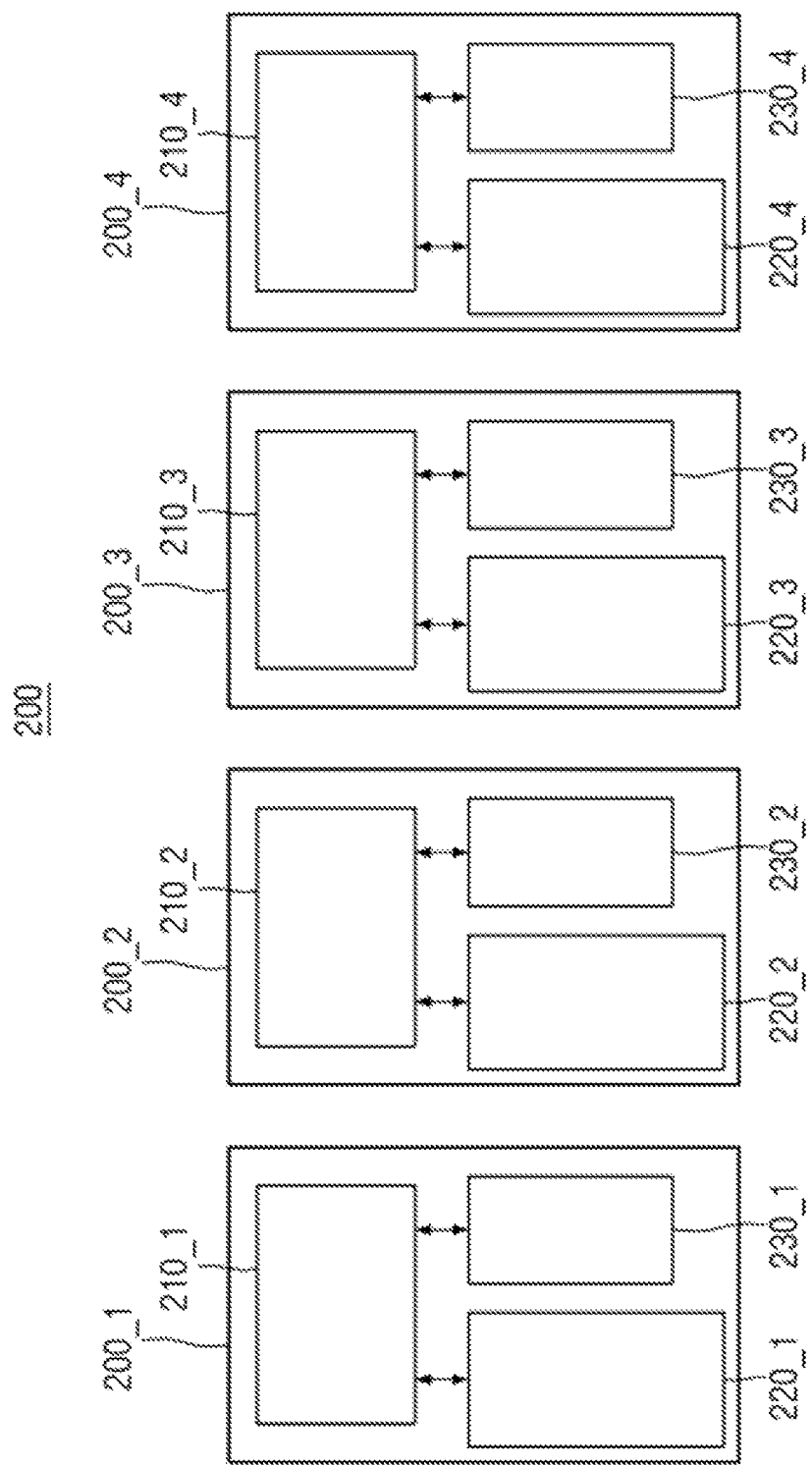
FIG. 4 schematically illustrates a storage device that performs a decoding computation based on an erasure code according to some embodiments.

FIG. 4 schematically illustrates a storage device that performs an decoding computation based on an erasure code according to some embodiments.

Referring to FIG. 4, in some embodiments, the storage device 200 includes a plurality of storage devices 2001 to 200_4. Each of the plurality of storage devices 2001 to 200_4 include storage controllers 210_1 to 210_4, non-volatile memories 220_1 to 220_4, and computational engines 230_1 to 230_4 as described with reference to FIG. 1.

Although FIG. 4 shows the computational engines 230_1 to 230_4 as independent entities, and the data stored in the non-volatile memories 220_1 to 220_4 as received from the storage controllers 210_1 to 210_4, embodiments are not necessarily limited thereto. As illustrated in FIG. 1, the computational engines 230_1 to 230_4 may be included in the storage controllers 210_1 to 210_4 and may directly receive the data stored in the non-volatile memories 220_1 to 220_4, depending on the internal configuration.

Figure 5:
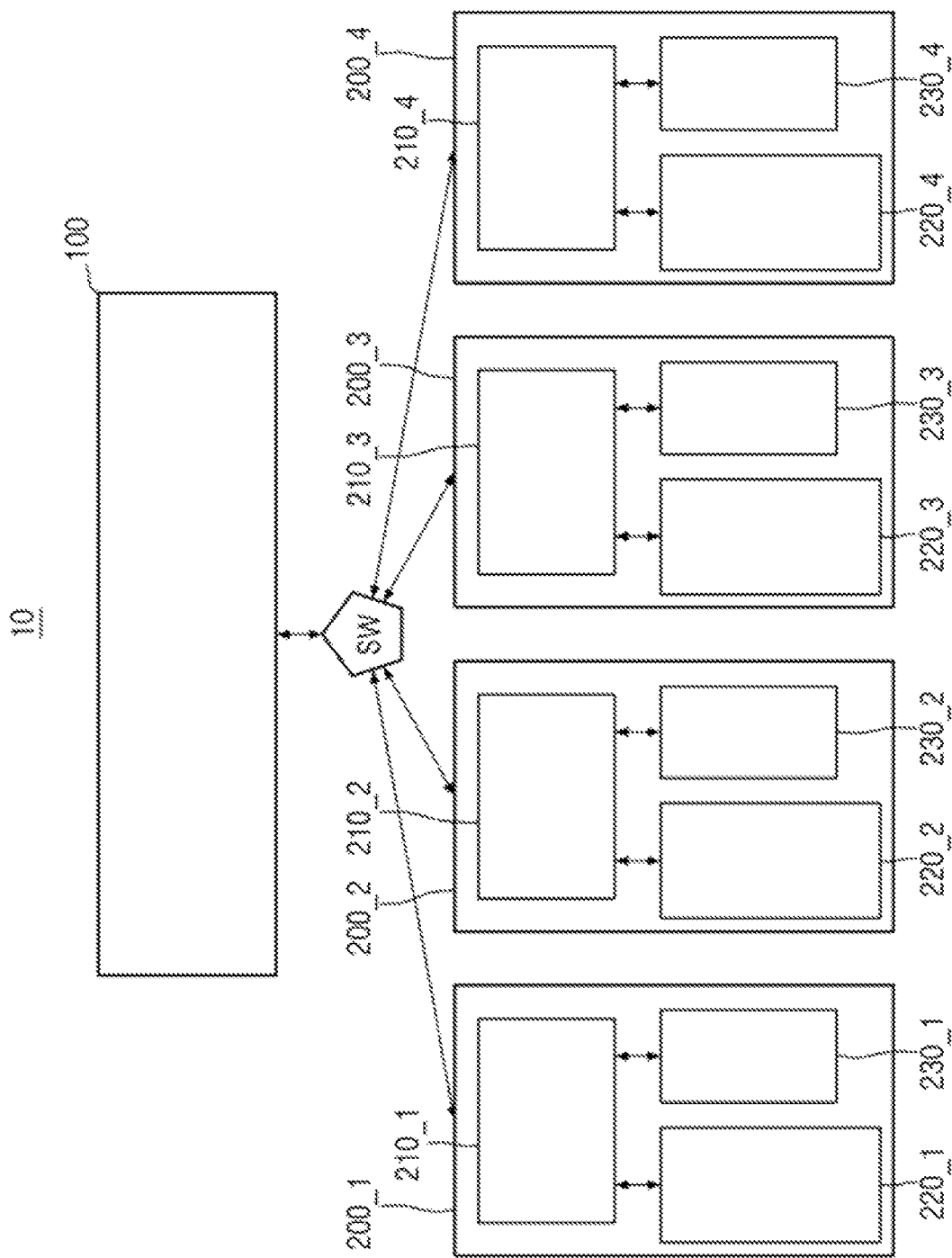
FIG. 5 schematically illustrates a host-storage system that performs a decoding computation based on an erasure code according to some embodiments.

FIG. 5 schematically illustrates a host-storage system that performs a decoding computation based on an erasure code according to some embodiments.

Referring to FIG. 5, in some embodiments, the host-storage system 10 include a host 100, a plurality of storage devices 200_1 to 200_4, and a switch SW.

The host-storage system 10 shown in FIG. 5 has substantially the same operation as the host-storage system 10 shown in FIG. 1, except that the former includes a plurality of storage devices 200_1 to 200_4.

The switch SW may be configured to be included in the host interface 211 shown in FIG. 1. Although the switch SW may be implemented as an Ethernet or a PCIe switch, embodiments are not necessarily limited thereto.

The plurality of storage devices 200_1 to 200_4 and the host 100 are connected to the switch SW to share data. For example, the data stored in any one of the plurality of storage devices 200_1 to 200_4 can be transmitted to another of the plurality of storage devices 200_1 to 200_4, or can be transmitted to the host 100.

Specifically, as described with reference to FIG. 3, the data stored in the plurality of storage devices 200_1 to 200_4 includes the original data and the parity data. Of this data, only the original data is transmitted to the host 100 from the plurality of storage devices 200_1 to 200_4. For example, a total amount of transmission to the host 100 is equal to a capacity of the whole original data.

More specifically, the original data stored in any of the plurality of storage devices 200_1 to 200_4 can be transmitted to one of the other storage devices 200_1 to 200_4 at the time of transmission to the host 100. For example, the original data stored in one of the plurality of storage devices 200_1 to 200_4 is transmitted to another of the plurality of storage devices 200_1 to 200_4 through a multicast or broadcast method.

However, at the same time when the original data stored in one of the plurality of storage devices 200_1 to 200_4 is transmitted to the host 100, the original data does not always need to be transmitted to the other storage devices 200_1 to 200_4. Specifically, the stored original data can be transmitted at the time when it is transmitted to the multiple destinations to reduce the overhead of the entire network.

Through the aforementioned conditions, since the host 100 receives only the original data, to the host does not participate in a decoding computation, and thus the consumption of the host's 100 computational resources can be reduced. Further, since the data is shared between the plurality of storage devices 200_1 to 200_4 by a multicast or broadcast method, not a P2P (Peer to peer) method, the consumption of communication resources can be reduced. Accordingly, network overhead can be prevented.

Figure 6:
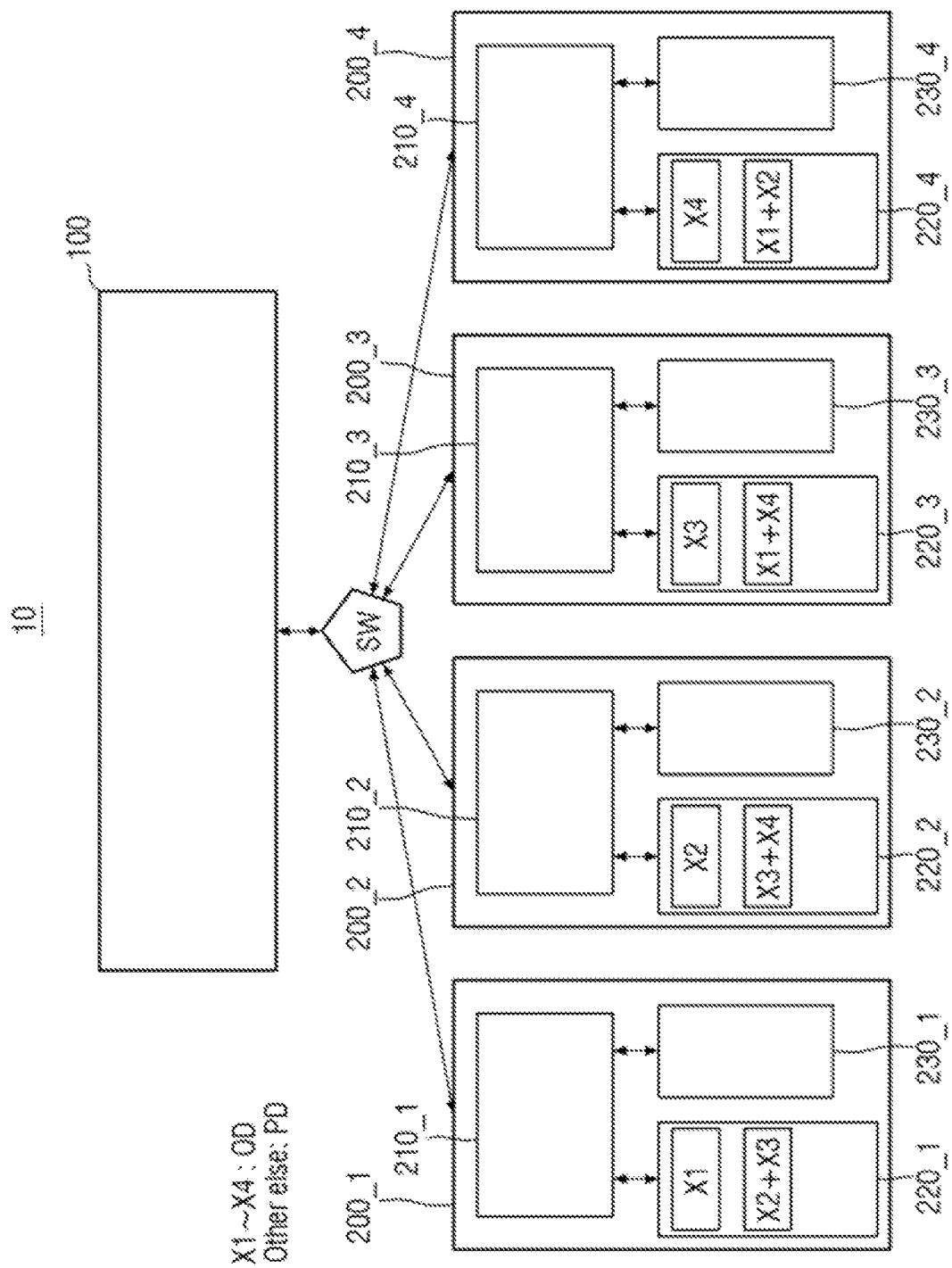
FIG. 6 illustrates a method for performing a decoding computation by a host-storage system based on an erasure code according to some embodiments.

FIG. 6 illustrates a method for performing a decoding computation by a host-storage system based on an erasure code according to some embodiments.

Referring to FIG. 6, in some embodiments, a first non-volatile memory 220_1 stores a first original data X1 and first parity data X2+X3. That is, the first original data X1 and the first parity data X2+X3 correspond to OD1 and PD1 shown in FIG. 3, respectively.

A second non-volatile memory 2202 stores a second original data X2 and second parity data X3+X4. That is, the second original data X2 and the second parity data X3+X4 correspond to OD2 and PD2 shown in FIG. 3, respectively.

A third non-volatile memory 220_3 stores a third original data X3 and third parity data X1+X4. That is, the third original data X3 and the third parity data X1+X4 correspond to the OD3 and PD3 shown in FIG. 3, respectively.

A fourth non-volatile memory 220_4 stores a fourth original data X4 and fourth parity data X1+X2. That is, the fourth original data X4 and the fourth parity data X1+X2 correspond to the OD4 and PD4 shown in FIG. 3, respectively.

FIGS. 7 to 9 and 11 to 13 illustrate a method for performing a decoding computation by a host-storage system based on an erasure code according to some embodiments. FIGS. 10 and 14 illustrate a method for performing a decoding computation by a computing engine based on an erasure code according to an embodiment. Hereinafter, description will be made referring to FIGS. 7 to 14.

Figure 7:
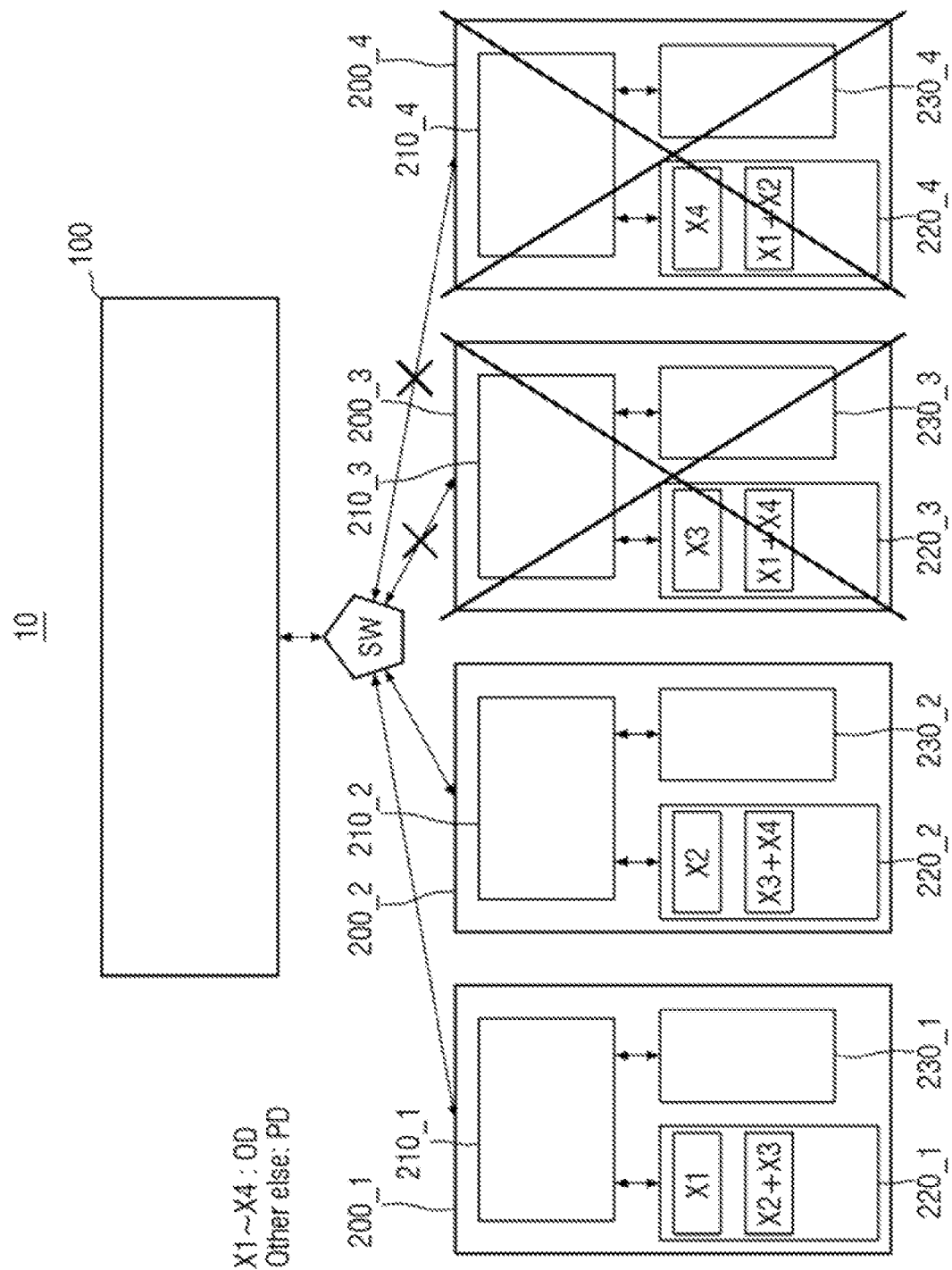
FIG. 7 illustrates a method for performing a decoding computation by a host-storage system based on an erasure code according to some embodiments.

First, referring to FIG. 7, in some embodiments, for example, assume that the third storage device 200_3 and the fourth storage device 200_4 are in a disabled status. In this case, the host 100 cannot read the third original data X3 stored in the third storage device 200_3 and the fourth original data X4 stored in the fourth storage device 200_4.

When some of the plurality of storage devices are disabled, the storage device capable of performing a distributed decoding according to some embodiments of the present disclosure restores the original data by using the stored original data and parity data, and provides the whole original data in response to a read command of the host.

Figure 8:
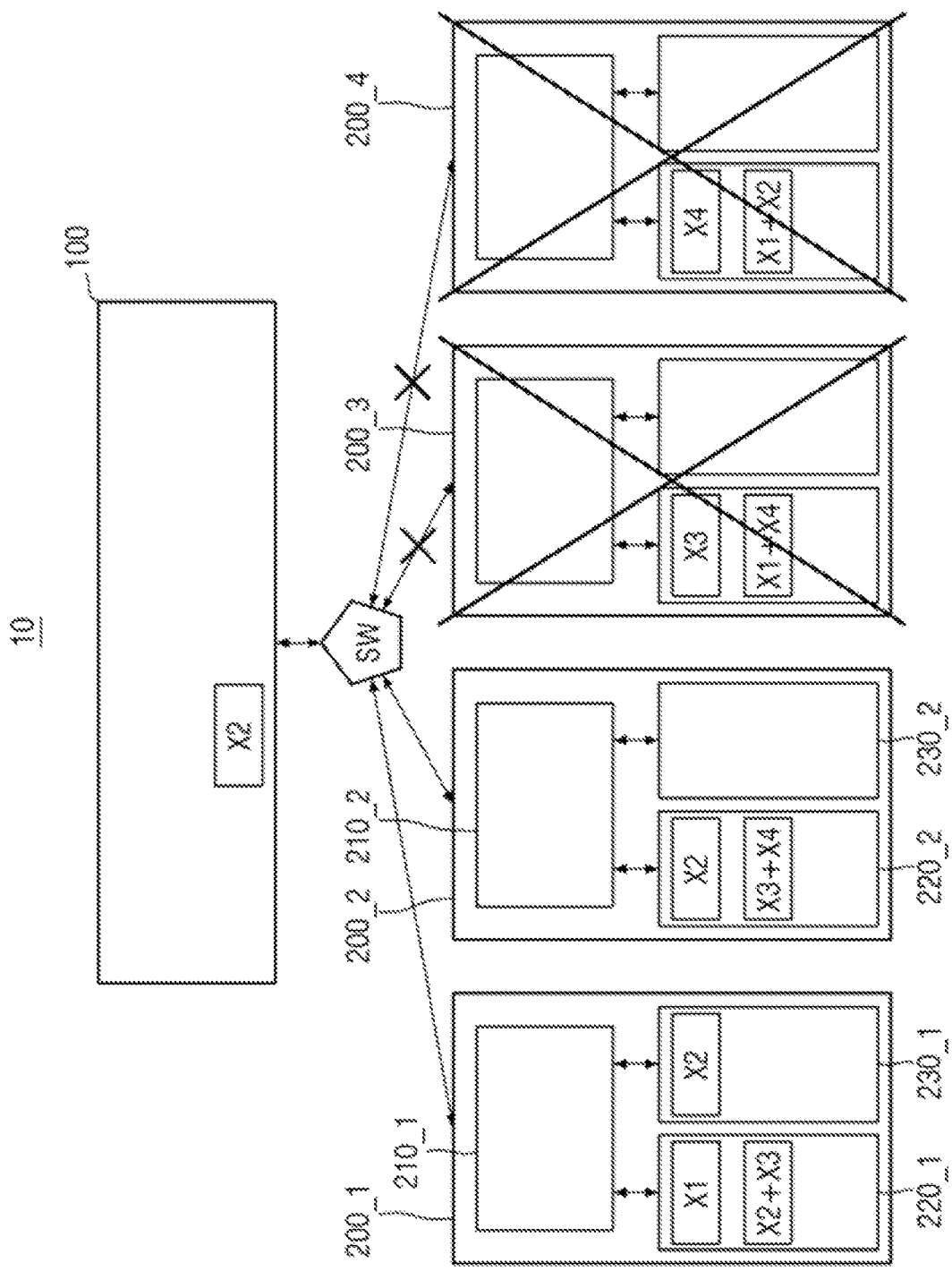
FIG. 8 illustrates a method for performing a decoding computation by a host-storage system based on an erasure code according to some embodiments.

Referring to FIG. 8, in some embodiments, the second original data X2 stored in the second non-volatile memory 2202 of the second storage device 200_2 is transmitted to a first computational engine 230_1 of the first storage device 200_1 through a switch SW. Further, the second original data X2 is also transmitted to the host 100 through a multicast transmission method.

On the other hand, as described with reference to FIG. 5, since only the original data can be moved to the plurality of storage devices 200_1 to 200_4 and the host 100, the second parity data X3+X4 stored in the second non-volatile memory 2202 is not transmitted through the switch SW in FIG. 8.

Figure 9:
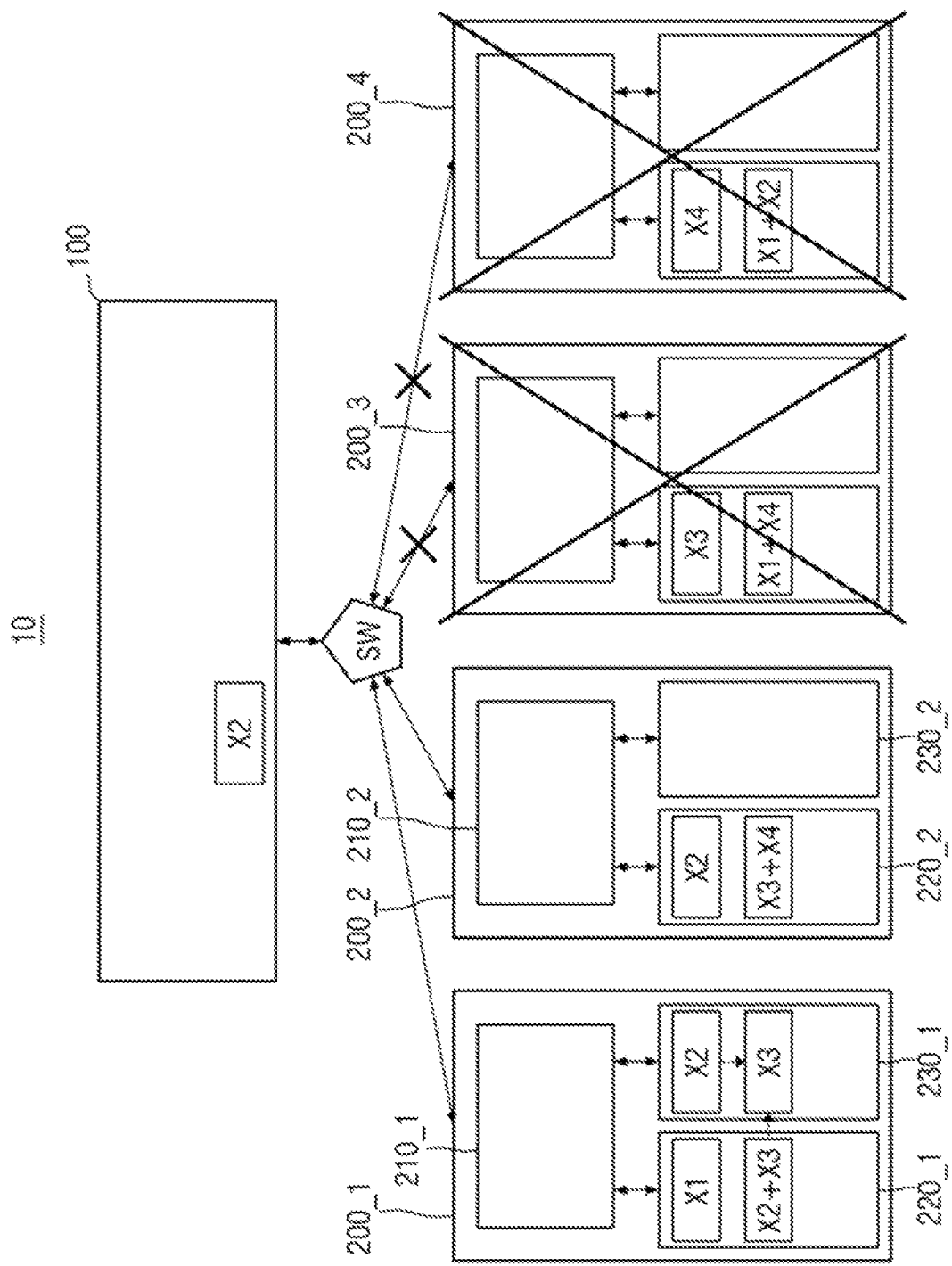
FIG. 9 illustrates a method for performing a decoding computation by a host-storage system based on an erasure code according to some embodiments.
Figure 10:
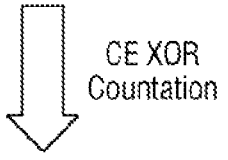
FIG. 10 illustrates a method for performing a decoding computation by a computing engine based on an erasure code according to an embodiment.

Referring to FIG. 9, in some embodiments, the first computational engine 230_1 performs a computation based on the first parity data X2+X3 stored in the first non-volatile memory 220_1 and the second original data X2 provided from the second storage device 200_2 to restore the third original data X3. Specifically, the first computational engine 230_1 performs an XOR computation on the first parity data X2+X3 and the second original data X2 to restore the third original data X3.

Referring to FIG. 10, in some embodiments, in Table 1, assume that, for example, the first original data X1 has a value of 1, the second original data X2 has a value of 0, the third original data X3 has a value of 0, and the fourth original data X4 has a value of 1.

The parity data is obtained by performing an XOR computation based on the original data as described with reference to FIG. 3. Therefore, in FIG. 9, the first parity data X2+X3 has a value of 0, the second parity data X3+X4 has a value of 1, the third parity data X1+X4 has a value of 0, and the fourth parity data X1+X2 has a value of 1.

Referring to Table II, the first computational engine 230_1 of FIG. 9 performs an XOR computation based on the first parity data X2+X3 and the second original data X2, and the corresponding result value is 0. For example, the first computational engine 230_1 restores the third original data X3 through the XOR computation of the first parity data X2+X3 and the second original data X2.

Figure 11:
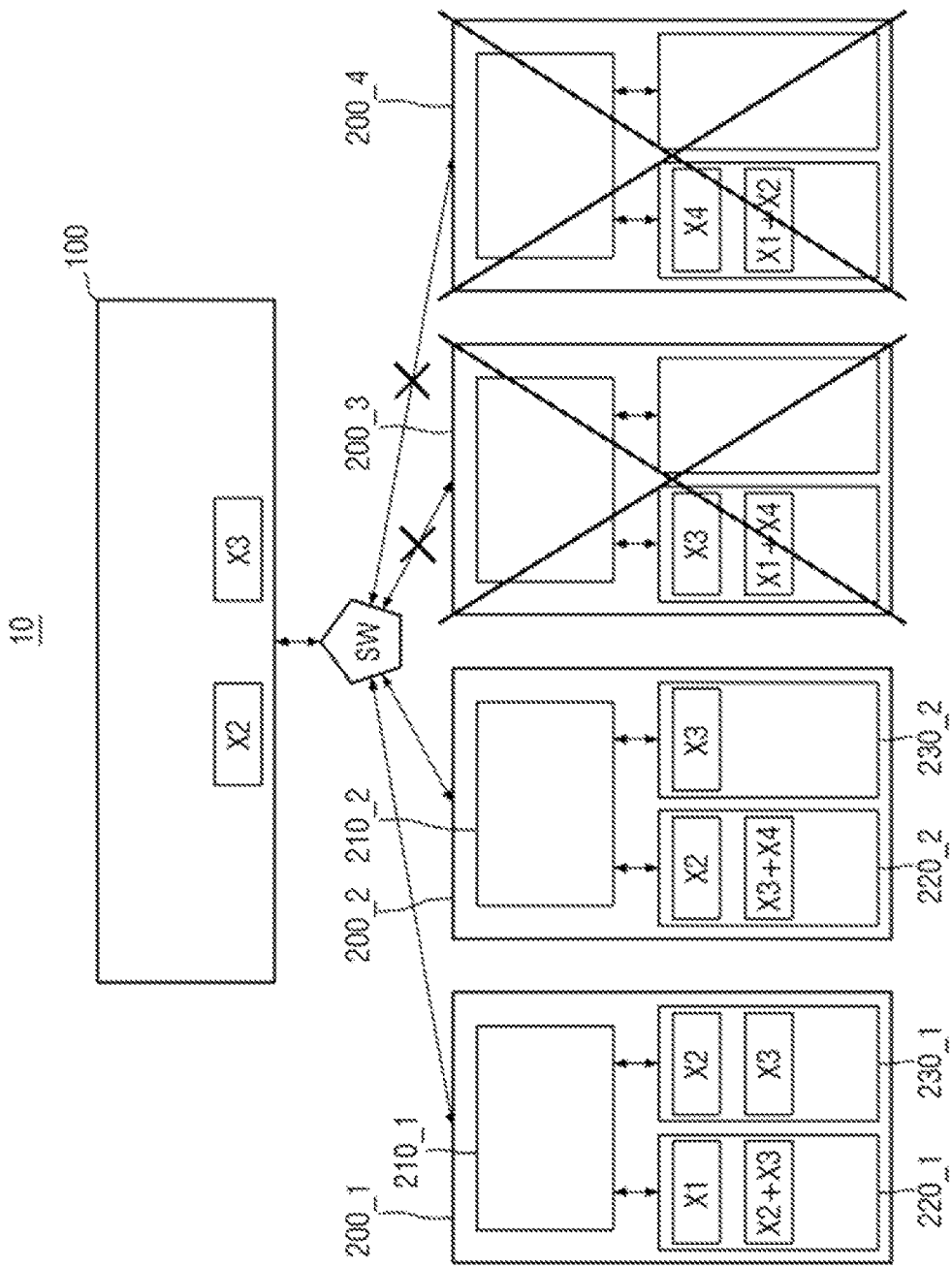
FIG. 11 illustrates a method for performing a decoding computation by a host-storage system based on an erasure code according to some embodiments.

Referring to FIG. 11, in some embodiments, the third original data X3 restored by the first computational engine 230_1 is transmitted to a second computational engine 230_2 of the second storage device 200_2 through the switch SW. Similar to the second original data X2, the third original data X3 is also transmitted to the host 100 through a multicast transmission method.

On the other hand, as described with reference to FIG. 5, since only the original data can be moved to the plurality of storage devices 200_1 to 200_4 and the host 100, the first parity data X2+X3 stored in the first non-volatile memory 220_1 of the first storage device 200_1 is not transmitted through the switch SW.

Figure 12:
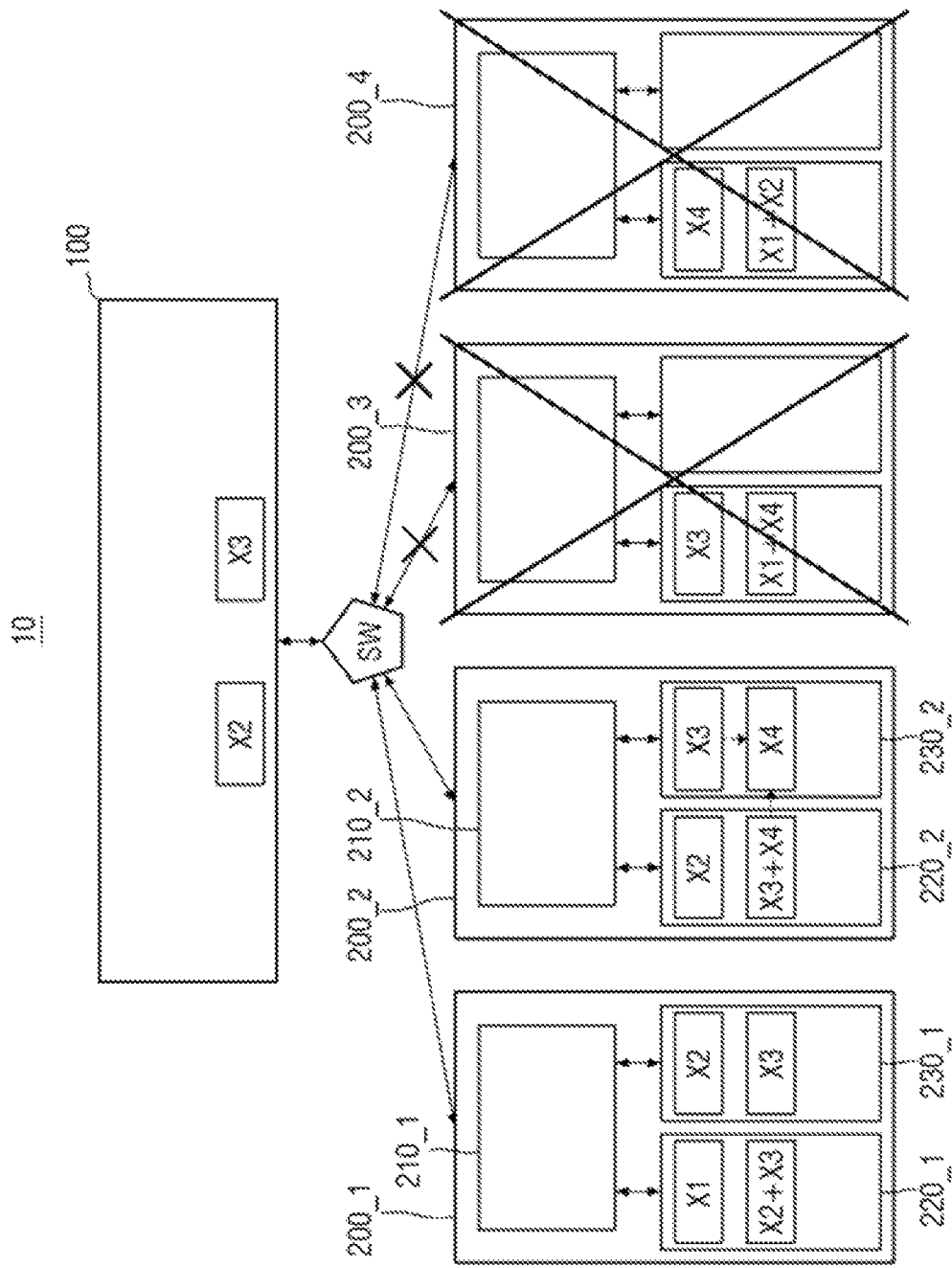
FIG. 12 illustrates a method for performing a decoding computation by a host-storage system based on an erasure code according to some embodiments.

Referring to FIG. 12, in some embodiments, the second computational engine 230_2 performs a computation on the basis of the second parity data X3+X4 stored in the second non-volatile memory 220_2 and the third original data X3 provided from the first storage device 200_1 to restore the fourth original data X4. Specifically, the second computational engine 230_2 performs an XOR computation on the second parity data X3+X4 and the third original data X3 to restore the fourth original data X4.

Referring to FIG. 10, In some embodiments, in Table II, the third original data X3 restored from the first storage device 200_1 has a value of 0, and the second parity data X3+X4 stored in the second non-volatile memory 220_2 has a value of 1. Therefore, the second computational engine 230_2 of FIG. 12 performs an XOR computation based on the second parity data X3+X4 and the third original data X3, and the corresponding result value is 1. For example, the second computational engine 230_2 restores the fourth original data X4 through an XOR computation of the second parity data X3+X4 and the third original data X3.

Figure 13:
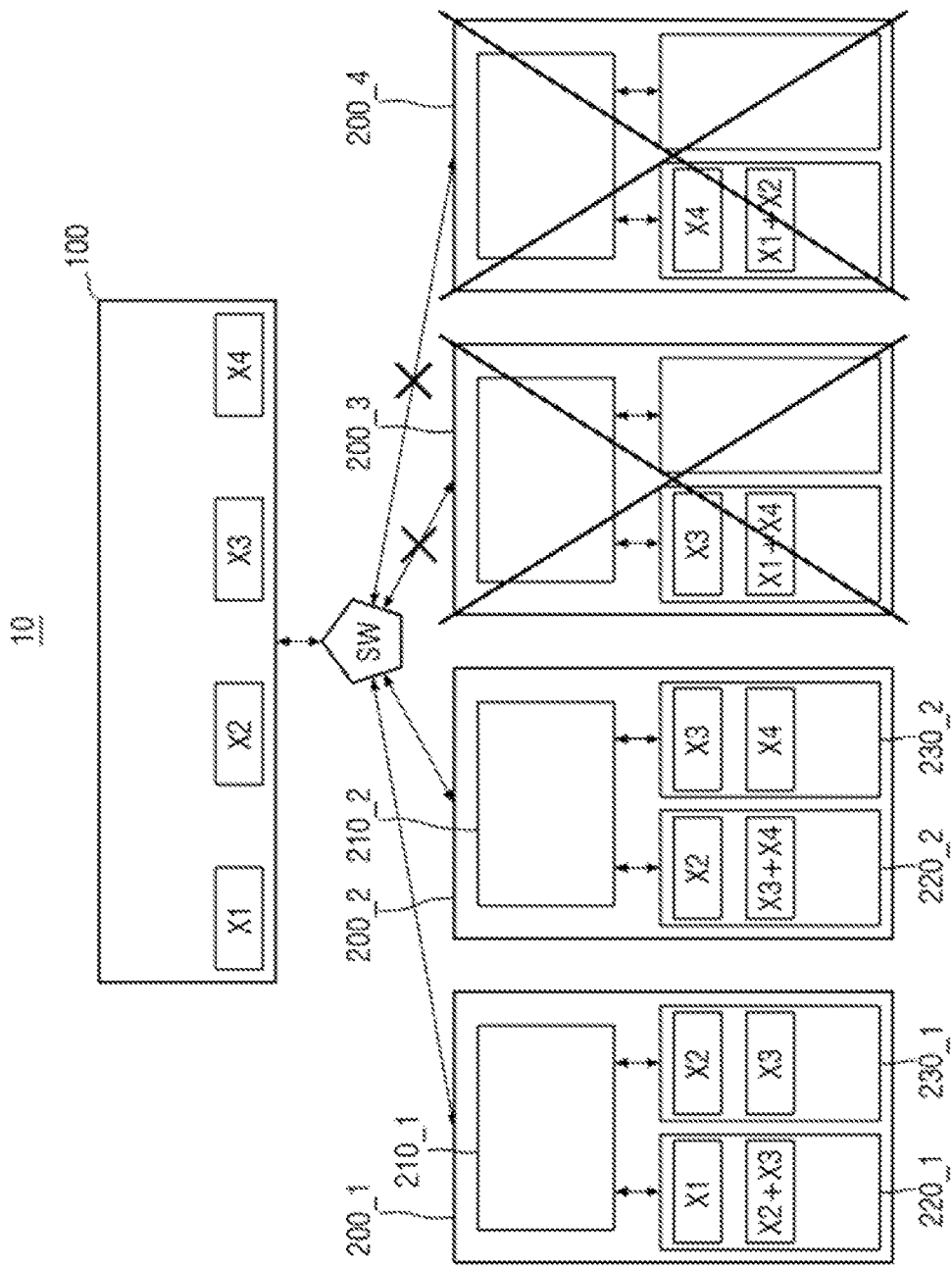
FIG. 13 illustrates a method for performing a decoding computation by a host-storage system based on an erasure code according to some embodiments.

Referring to FIG. 13, in some embodiments, in response to a read command of the host 100, the first storage device 200_1 transmits the first original data X1 to the host, and the second storage device 200_2 transmits the restored fourth original data X4 to the host.

The transmission of the original data between the plurality of storage devices is performed simultaneously when the original data is transmitted to the host. However, when the original data is transmitted from one of the plurality of storage devices to the host, the original data need not be transmitted to any of the plurality of storage devices. Therefore, the first original data X1 stored in the first storage device 200_1 is not transmitted to the second storage device 200_2, and the fourth original data X4 restored from the second storage device 200_2 is also not transmitted to the first storage device 200_1.

The second original data X2 and the third original data X3 present in the first computational engine 230_1 are deleted from the first computational engine 230_1 when an decoding operation that corresponds to a read command of the host is completed. Similarly, the third original data X3 and the fourth original data X4 present in the second computational engine 230_2 are also deleted from the second computational engine 230_2 when an decoding operation is completed.

Referring to FIG. 14, in some embodiments, unlike FIG. 10, in Table III, assume that, for example, the first original data X1 has a value of 1, the second original data X2 has a value of 1, the third original data X3 has a value of 0, and the fourth original data X4 has a value of 1.

Further, as shown in FIGS. 6 to 9 and 10 to 13, assume that the first to fourth original data and the first to fourth parity data are stored, and the third storage device 200_3 and the fourth storage device 200_4 are in a disabled status.

As described with reference to FIGS. 6 to 13, the first computational engine 230_1 restores the third original data X3 based on the first parity data X2+X3 and the second original data X2, and the second computational engine 230_3 restores the fourth original data X4 based on the second parity data X3+X4 and the restored third original data X3.

Specifically, referring to Table IV of FIG. 14, in some embodiments, the first computational engine 230_1 restores the third original data X3 of a value of 0 through an XOR computation of the first parity data X2+X3, which have a value of 1, and the second original data X2, which have a value of 1. Similarly, the second computational engine 230_2 restores the fourth original data X4 to a value of 1 through an XOR computation of the second parity data X3+X4, which has a value of 1, and the restored third original data X3, which has a value of 0.

For example, all the original data is restored through an erasure code according to some embodiments and a distributed decoding method that uses the storage device.

In addition, although FIGS. 7 to 13 show that the third storage device 200_3 and the fourth storage device 200_4 are disabled, for example, now assume that the first storage device 200_1 and the second storage device 200_2 are disabled.

Similar to the method described with reference to FIGS. 7 to 13, first, the fourth storage device 200_4 transmits the fourth original data X4 to the host 100 and the third storage device 200_3.

A third computational engine 230_3 performs a computation based on the third parity data X1+X4 stored in the third non-volatile memory 220_3 and the fourth original data X4 received from the fourth storage device 200_4 to restore the first original data X1.

Specifically, referring to Table IV of FIG. 14, the third computational engine 230_3 restores the first original data X1 to a value of 1 through an XOR computation of the third parity data X1+X4, which has a value of 0, and the fourth original data X4, which has a value of 1.

The third storage device 200_3 transmits the restored first original data X1 to the host 100 and the fourth storage device 200_4.

A fourth computational engine 230<i>4</i> performs a computation based on the fourth parity data X1+X2 stored in the fourth non-volatile memory 220_4 and the restored first original data X1 received from the third storage device 200_3 to restore the second original data X2.

Specifically, referring to Table IV of FIG. 14, the fourth computational engine 230_4 restores the second original data X2 to a value of 1 through an XOR computation of the fourth parity data X1+X2, which has a value of 0 and the first original data X1, which has a value of 1.

The third storage device 200_3 transmits the stored third original data X3 to the host 100, and the fourth storage device 200_4 transmits the restored second original data X2 to the host 100, and the host 100 reads all of the original data.

For example, all of the original data can be restored through any two of the four storage devices 200_1 to 200_4 shown in FIGS. 7 to 13, through an erasure code according to some embodiments and a distributed decoding method of a storage device. Specifically, all the original data can be restored in all cases of $_4C_2=6$.

Further, parity data is generated and decoding is performed, unlike that shown in FIGS. 7 to 13.

For example, assume that the first parity data is X2+X4, the second parity data is X1+X3, the third parity data is X1+X4, and the fourth parity data is X2+X3. Further, assume that the second storage device 200_2 and the third storage device 200_3 are disabled.

As in a method described with reference to FIGS. 7 to 13, first, the fourth storage device 200_4 transmits the fourth original data X4 to the host 100 and the first storage device 200_1.

The first computational engine 230_1 performs a computation based on the first parity data X2+X4 stored in the first non-volatile memory 220_1 and the fourth original data X4 received from the fourth storage device 200_4 to restore the second original data X2.

Specifically, referring to Table IV of FIG. 14, the first computational engine 230_1 restores the second original data X2 to a value of 1 through an XOR computation of the first parity data X2+X4, which has a value of 0, and the fourth original data X4, which has a value of 1.

The first storage device 200_1 transmits the restored second original data X2 to the host 100 and the fourth storage device 200_4.

The fourth computational engine 230<i>4</i> performs a computation based on the fourth parity data X2-+X3 stored in the fourth non-volatile memory 220_4 and the restored second original data X2 received from the first storage device 200_1 to restore the third original data X3.

Specifically, referring to Table IV of FIG. 14, the fourth computational engine 230_4 restores the third original data X3 to a value of 0 through an XOR computation of the fourth parity data X2+X3, which has a value of 1, and the second original data X2, which has a value of 1.

The first storage device 200_1 transmits the stored first original data X1 to the host 100, and the fourth storage device 200_4 transmits the restored third original data X3 to the host 100, and the host 100 reads all of the original data.

For example, there is not only a combination of the parity data shown in FIGS. 7 to 13, but also a combination of various parity data that enables all the original data to be restored by using the original data and the parity data stored in any two storage devices.

Figure 15:
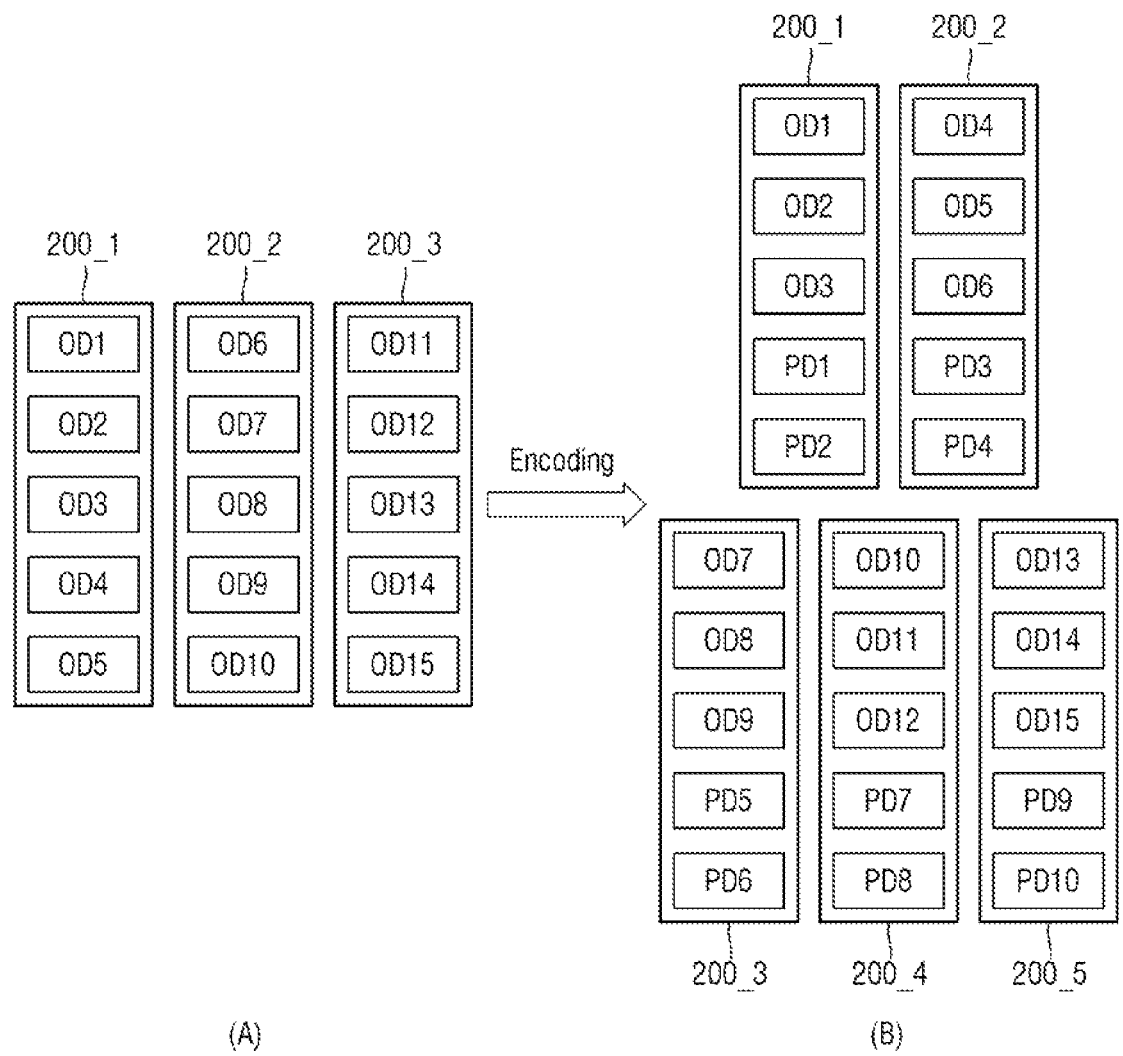
FIG. 15 schematically illustrates an encoding method that uses an erasure code according to some embodiments.

FIG. 15 schematically illustrates an encoding method that uses an erasure code according to some embodiments. Hereinafter, differences from embodiments described with reference to FIG. 3 will be mainly described.

Referring to FIG. 15, in some embodiments, unlike FIG. 3, in (A), the first storage device 200_1 stores five original data OD1 to OD5, the second storage device 200_1 similarly stores five original data OD6 to OD10, and the third storage device 200_3 also similarly stores five original data OD11 to OD15. In (A), the size of the whole original data is 15 bits because there are fifteen original datas.

In (B), additional storage devices are used to store the original data OD1 to OD15 and the additionally generated parity data PD1 to PD10. For example, the fourth storage device 200_4 and the fifth storage device 200_5 are used to store the existing original data OD1 to OD15 and the additionally generated parity data PD1 to PD10.

In a encoding process, each of the plurality of storage devices 200_1 to 200_5 evenly distributes and stores the original data OD1 to OD15. Further, each of the plurality of storage devices 200_1 to 200_5 evenly distributes and stores the parity data PD1 to PD10.

Specifically, the first storage device 200<i>1</i> stores three original data OD1 to OD3 and two parity data PD1 and PD2. The second storage device 200_2 stores three original data OD4 to OD6 and two parity data PD3 and PD4. The third storage device 200_3 stores three original data OD7 to OD9 and two parity data PD5 and PD6. The fourth storage device 200_4 stores three original data OD10 to OD12 and two parity data PD7 and PD8. The fifth storage device 200_5 stores three original data D13 to OD15 and two parity data PD9 and PD10.

As described with reference to FIG. 3, in some embodiments, the parity data is generated by performing an XOR computation on original data of the whole original data to restore the original data. Specifically, the parity data is generated by performing an XOR computation on three original data of the fifteen whole original data so that all the fifteen original data can be restored even if only any three of the five storage devices 200_1 to 200_5 are used.

The sizes of each of the parity data PD1 to PD10 is 1 bit, which is the same as the sizes of each of the original data OD1 to OD15. Therefore, the size of the data block stored in the plurality of storage devices 200_1 to 200_5 is 5 bits both before and after encoding.

Figure 16:
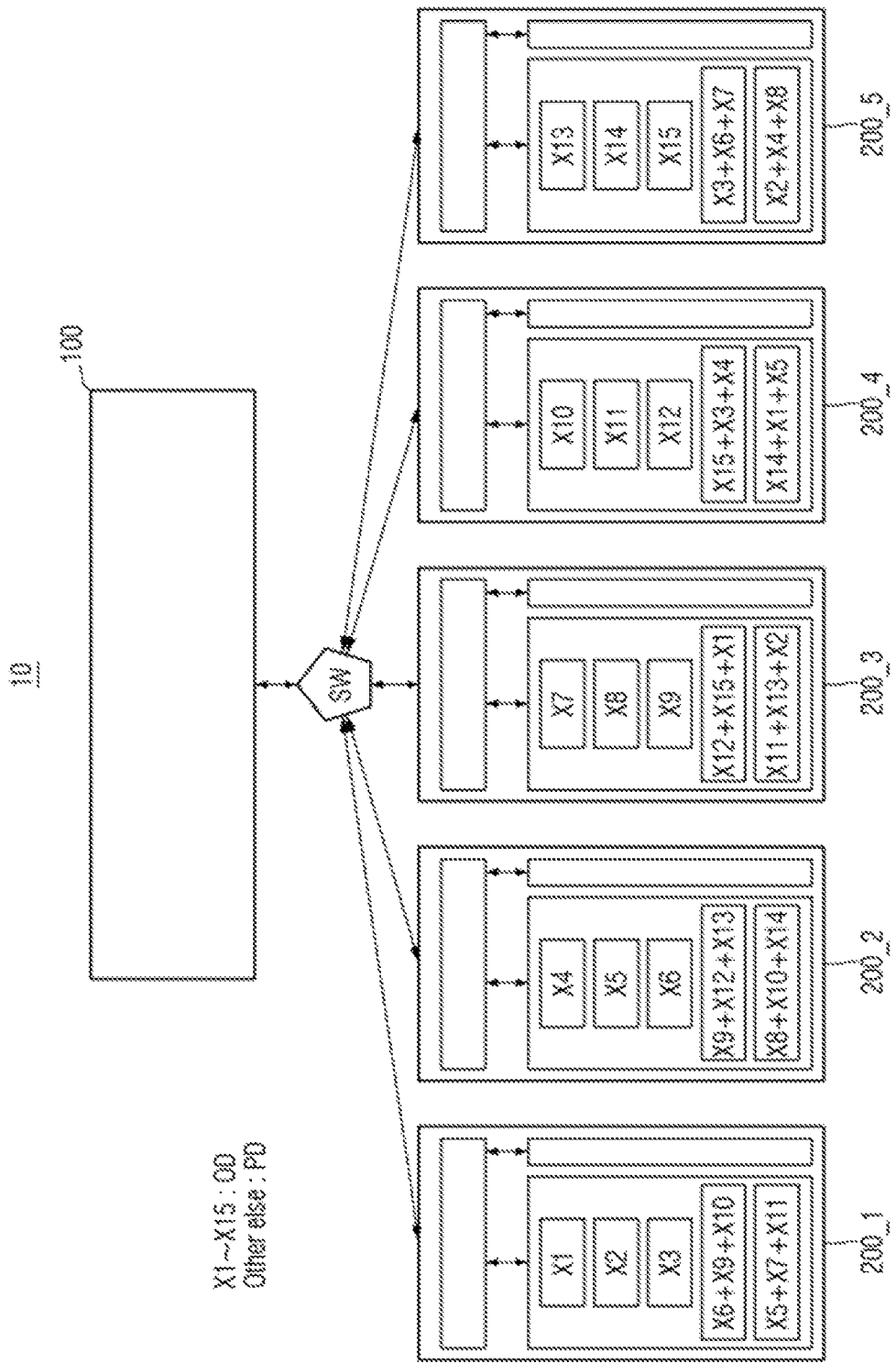
FIG. 16 illustrates a method for performing a decoding computation by a host-storage system on the basis of an erasure code according to some embodiments.

FIG. 16 illustrates a method for performing a decoding computation by a host-storage system on the basis of an erasure code according to some embodiments.

Referring to FIG. 16, in some embodiments, all the original data X1 to X15 can be restored by using any three storage devices of the five storage devices 200_1 to 200_5. Since a specific method is substantially the same as that described with reference to FIGS. 7 to 13, a repeated description is omitted below.

Further, as described with reference to FIGS. 7 to 13, in addition to parity data combinations shown in FIG. 16, there are also other combinations of parity data that enable all of the original data to be restored by the use of the original data and the parity data stored in the three any storage devices.

Figure 17:
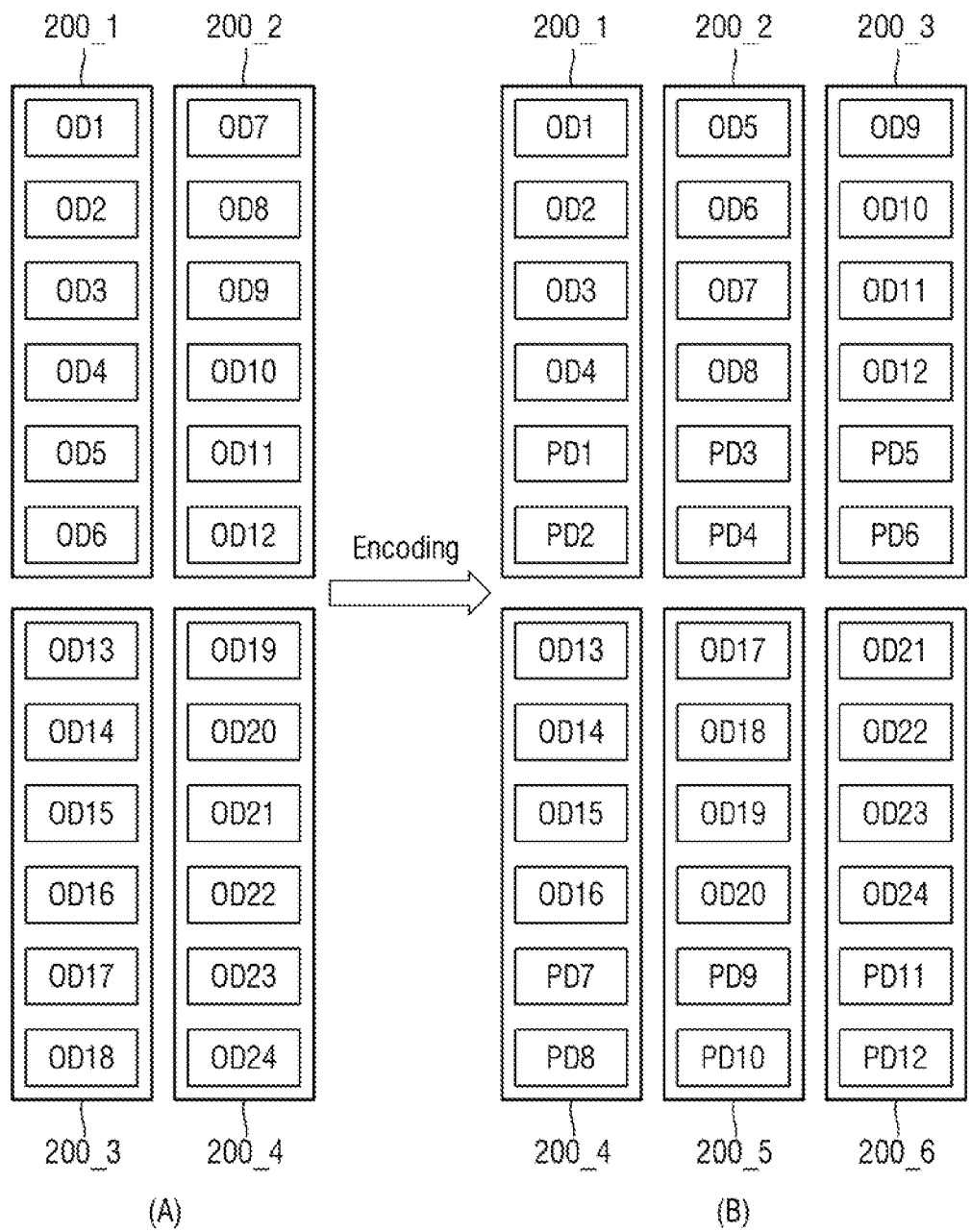
FIG. 17 schematically illustrates an encoding method that uses an erasure code according to some other embodiment.

FIG. 17 schematically illustrates an encoding method using an erasure code according to some embodiments.

Referring to FIG. 17, in some embodiments, unlike FIGS. 3 and 15, in (A), the first storage device 200_1 stores six original data OD1 to OD6, the second storage device 200_2 stores six original data OD7 to OD12, the third storage device 200_3 also stores six original data OD13 to OD18, and the fourth storage device 200_4 also stores six original data OD19 to OD24. In (A), the size of the whole original data is 24 bits because there are twenty-four original datas.

In (B), additional storage devices are used to store the original data OD1 to OD24 and the additionally generated parity data PD1 to PD12. That is, a fifth storage device 200_5 and a sixth storage device 200_6 are used to store the existing original data OD1 to OD24 and the additionally generated parity data PD1 to PD12.

In an encoding process, each of the plurality of storage devices 200_1 to 200_6 evenly distributes and stores the original data OD1 to OD24. Further, each of the plurality of storage devices 200_1 to 200_6 evenly distributes and stores the parity data PD1 to PD12.

Specifically, the first storage device 200_1 stores four original data OD1 to OD4 and two parity data PD1 and PD2. The second storage device 200_2 stores four original data OD5 to OD8 and two parity data PD3 and PD4. The third storage device 200_3 stores four original data OD9 to OD12 and two parity data PD5 and PD6. The fourth storage device 200_4 stores four original data OD13 to OD16 and two parity data PD7 and PD8. The fifth storage device 200_5 stores four original data OD17 to OD20 and two parity data PD9 and PD10. The sixth storage device 200_6 stores four original data OD21 to OD24 and two parity data PD11 and PD12.

As described with reference to FIGS. 3 and 15, the parity data is generated by performing an XOR computation on any original data of the whole original data to restore the original data. Specifically, the parity data is generated by performing an XOR computation on four original data of twenty-four original data so that all of the twenty-four original data can be restored even if only four of the six storage devices 200_1 to 200_6 are used.

The respective sizes of each of the parity data PD1 to PD12 is 1 bit, which is the same as the respective sizes of each of the original data OD1 to OD4. Therefore, the size of a data block stored in the plurality of storage devices 200_1 to 200_6 is 6 bits both before and after encoding.

Figure 18:
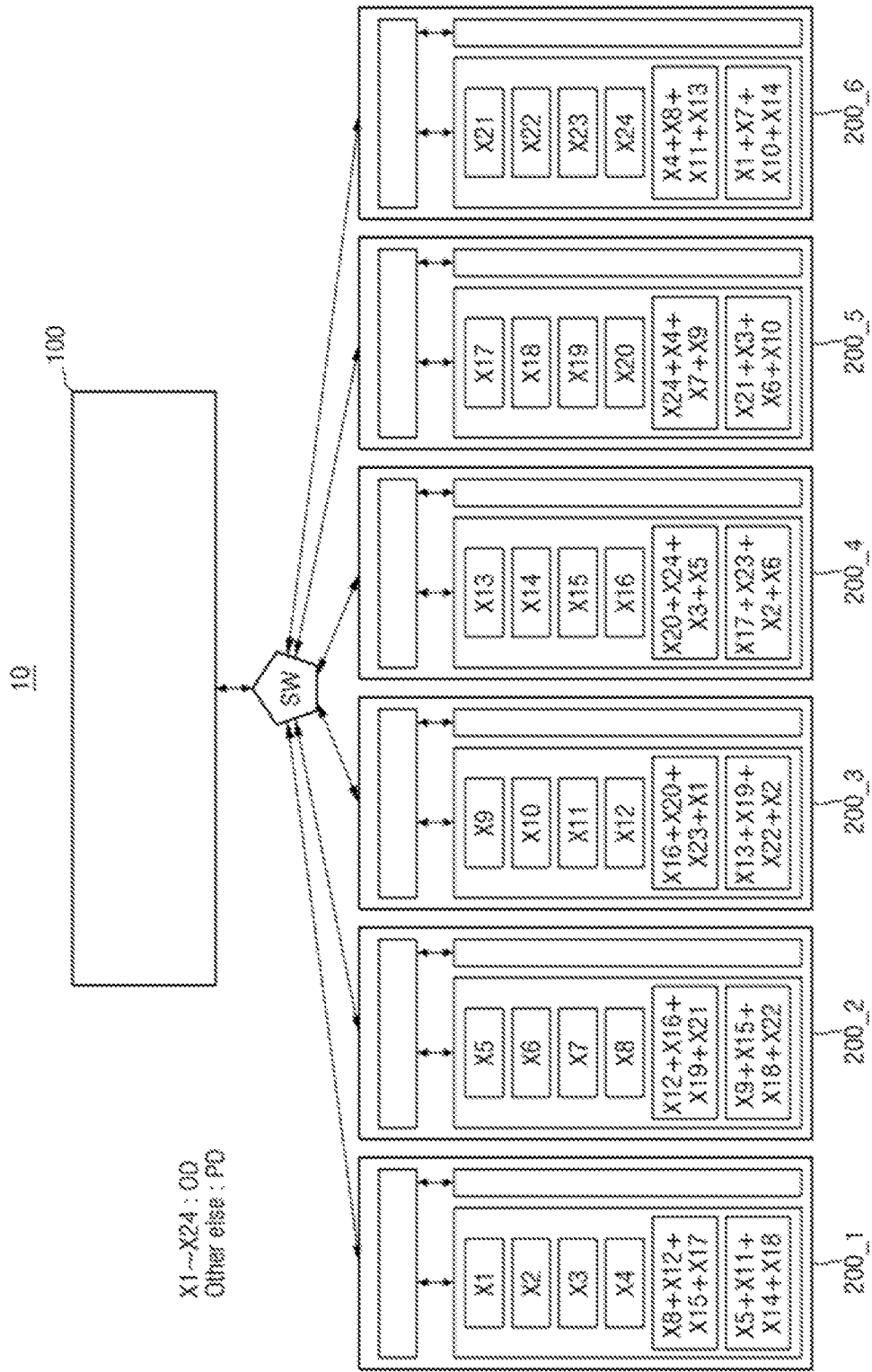
FIG. 18 illustrates a method for performing a decoding computation by a host-storage system based on an erasure code according to some embodiments.

FIG. 18 illustrates a method for performing a decoding computation by a host-storage system based on an erasure code according to some embodiments.

Referring to FIG. 18, in some embodiments, all of the original data X1 to X24 can be restored by using any four of the six storage devices 200_1 to 200_6. Since a specific method is substantially the same as that described with reference to FIGS. 7 to 13, a repeated description thereof will omitted below.

Further, as described in FIGS. 7 to 13, in addition to combinations of parity data shown in FIG. 18, various other combinations of parity data also enable all of the original data to be restored by using the original data and the parity data stored in any four storage devices.

Assuming, for convenience of description, that the number of original data blocks is K and the number of encoded data blocks is N, (N, K)=(4, 2) is described as an example with reference to FIGS. 7 to 13, (N, K)=(5, 3) is described as an example with reference to FIGS. 15 to 16, and (N, K)=(6, 4) is described as an example with reference to FIGS. 17 to 18. However, embodiments are not necessarily limited thereto.

Further, although FIGS. 7 to 18 illustrate as an example a host-storage system that has a relationship of (N, K)=(K+2, K) and can restore the original data by the data stored in any K storage devices, embodiments are not necessarily limited thereto.

For example, in some embodiments, a host-storage system may have a relationship of (N, K)=(4, 3) or may have a relationship of (N, K)=(10, 2). That is, according to an embodiment, a host-storage system can be configured by changing the relationship between N and K, and a distributed decoding can be performed on the storage device accordingly. Further, when a specific storage device of less than N−K is not available, a distributed decoding can be performed using the data stored in K+1 or more storage devices.

On the other hand, as the value of N/K approaches 1, a ratio of a parity block to be added as compared to the original data block is small. For example, as the value of N/K approaches 1, an above-described decoding method can be executed while efficiently using the storage space.

Figure 19:
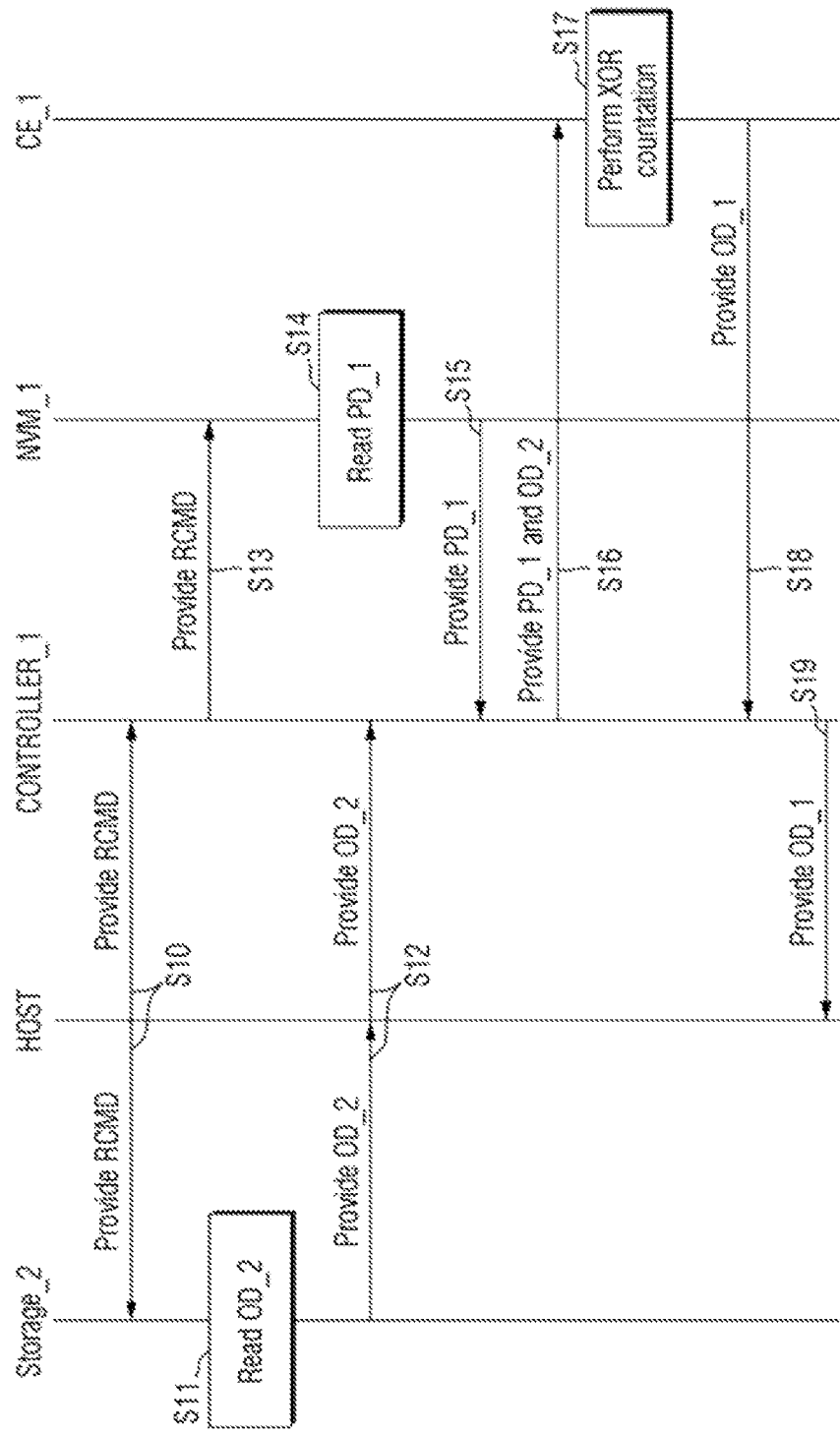
FIG. 19 is a flowchart of a data read and decoding computation of a host-storage system according to some embodiments.

FIG. 19 illustrates a data read and decoding computation of a host-storage system according to some embodiments.

Referring to FIG. 19, in some embodiments, the host provides a read command to the first storage controller and the second storage device to read the original data (S10). Specifically, the host provides a read command to the first storage controller in the first storage device and the second storage controller in the second storage device.

The second storage device reads the second original data stored in the second non-volatile memory (S11). The second original data is transmitted to the host and the first storage controller (S12). For example, as described above, the second original data is simultaneously transmitted to the first storage controller and the host through a multicast or broadcast method.

The first storage controller provides the received read command to the first non-volatile memory (S13). In response, the first non-volatile memory reads the first parity data (S14). Further, the first non-volatile memory provides the read first parity data to the first storage controller (S15).

Although FIG. 19 shows that the second original data read operation of the second storage device is performed before the first parity data read operation of the first non-volatile memory, this is for convenience of description, and embodiments are not necessarily limited thereto. For example, in other embodiments, the above two operations may be performed in a different order from each other, or may be performed at the same time.

The first storage controller provides the received second original data and first parity data to the first computational engine (S16). The first computational engine performs an XOR computation on the received second original data and first parity data (S17). The first computational engine generates the first original data and provides it to the first storage controller (S18). Since the transmission of the original data and the restoration of the original data through an XOR computation of the computational engine are the same as those described with reference to FIGS. 7 to 13, a repeated description thereof will omitted below.

The first storage controller transmits the received first original data to the host (S19). A decoding operation of the first storage device and the second storage device that corresponds to a read command of the host and a read request of the host is completed.

Figure 20:
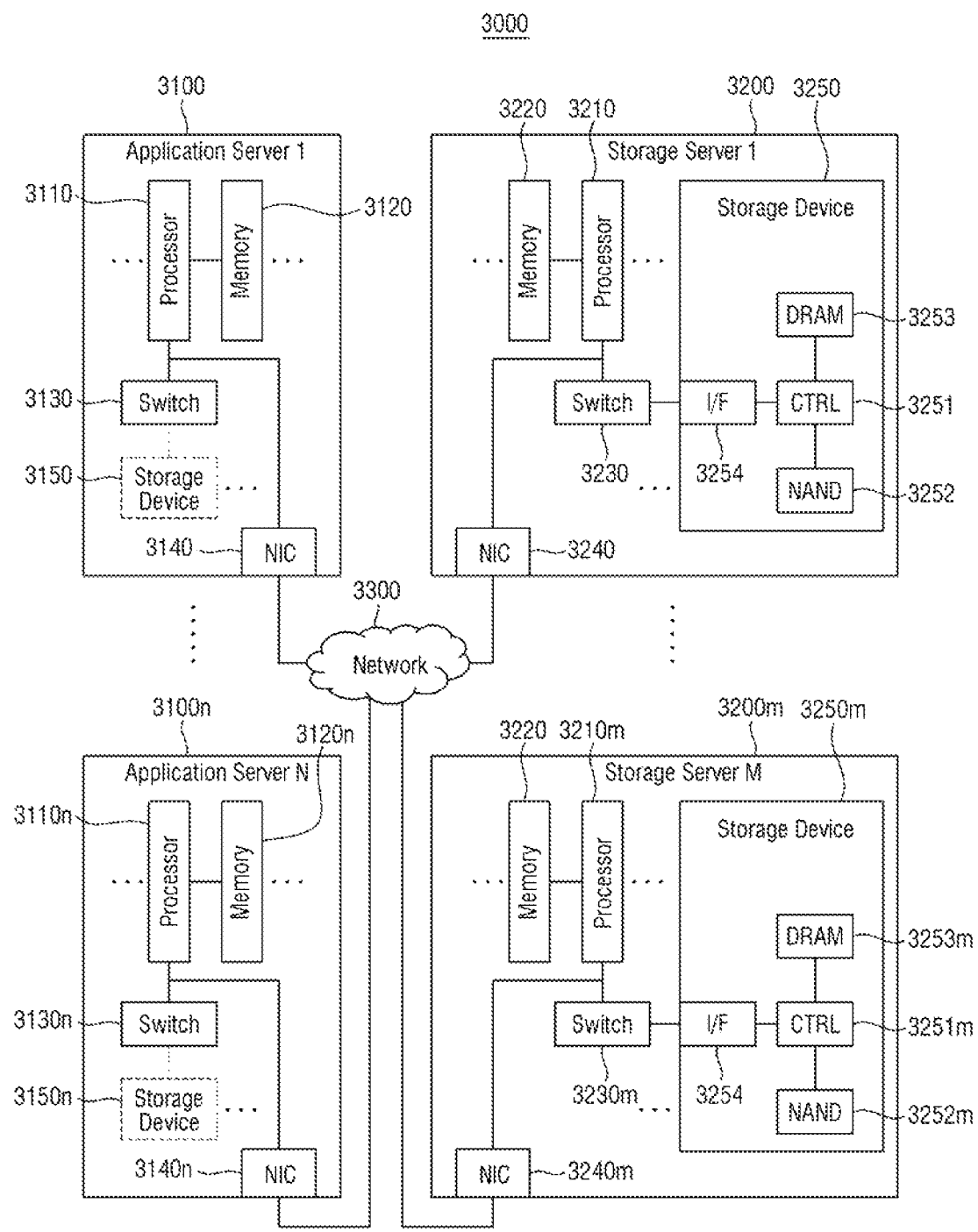
FIG. 20 illustrates a data center that incorporates a storage device according to some embodiments.

FIG. 20 illustrates a data center that incorporates a storage device according to some embodiments.

Referring to FIG. 20, in some embodiments, a data center 3000 is a facility that gathers various types of data and provides services, and may also be called a data storage center. The data center 3000 is a system for search engine and database operations, and is a computing system used by corporations such as banks or government agencies. The data center 3000 includes application servers 3100 to 3100n and storage servers 3200 to 3200m. The number of application servers 3100 to 3100n and the number of storage servers 3200 to 3200m may be variously selected depending on embodiments, and the number of application servers 3100 to 3100n and the number of storage servers 3200 to 3200m may differ from each other.

The application server 3100 or the storage server 3200 includes at least one of processors 3110 and 3210 and memories 3120 and 3220. The storage server 3200 will be described as an example. The processor 3210 controls the overall operation of the storage server 3200, and accesses the memory 3220 to execute command and/or data loaded into the memory 3220. The memory 3220 may be a DDR SDRAM (double data rate synchronous DRAM), an HBM (high bandwidth memory), an HMC (hybrid memory cube), a DIMM (dual in-line memory module), an Optane DIMM or a NVMDIMM (non-volatile DIMM). According to an embodiment, the number of processors 3210 and the number of memories 3220 in the storage server 3200 may be variously selected.

In an embodiment, the processor 3210 and the memory 3220 form a processor-memory pair. In an embodiment, the number of processors 3210 and memories 3220 may differ from each other. The processor 3210 may include a single core processor or a multi-core processor. The aforementioned description of the storage server 3200 also applies to the application server 3100. According to an embodiment, the application server 3100 does not include a storage device 3150. The storage server 3200 includes at least one or more storage devices 3250. The number of storage devices 3250 in the storage server 3200 may be variously selected depending on an embodiment.

The application servers 3100 to 3100n and the storage servers 3200 to 3200m communicate with each other through a network 3300. The network 3300 may be implemented using a FC (fibre channel) or an Ethernet, etc. FC is a medium used for a relatively high-speed data transfer, and may use an optical switch that provides high performance/high availability. The storage servers 3200 to 3200m may be provided as a file storage, a block storage or an object storage, depending on the access type of the network 3300.

In an embodiment, the network 3300 is a storage-only network such as a SAN (storage area network). For example, a SAN may be an FC-SAN that uses an FC network and is implemented according to FCP (FC protocol). For example, a SAN may be an IP-SAN that uses a TCP/IP network and is implemented according to an iSCSI (SCSI over TCP/IP or Internet SCSI) protocol. In an embodiment, the network 3300 is a general network such as a TCP/IP network. For example, the network 3300 may be implemented according to a protocol such as an FCoE (FC over Ethernet), an NAS (network attached storage), or an NVMe-oF (NVMe over fabrics).

Hereinafter, the application server 3100 and the storage server 3200 will be described. Descriptions of the application server 3100 also apply to another application server 3100n, and descriptions of the storage server 3200 also apply to another storage server 3200m.

The application server 3100 stores the data requested by a user or client to store in one of the storage servers 3200 to 3200m through the network 3300. Further, the application server 3100 acquires read data requested by the user or client from one of the storage servers 3200 to 3200m through the network 3300. For example, the application server 3100 may be implemented as a Web server, a DBMS (Database Management System), etc.

The application server 3100 accesses a memory 3120n or a storage device 3150n in another application server 3100n through the network 3300, or accesses the memories 3220 to 3220m or the storage devices 3250 to 3250m in the storage servers 3200 to 3200m through the network 3300. Accordingly, the application server 3100 can perform various operations on the data stored in the application servers 3100 to 3100n and/or the storage servers 3200 to 3200m. For example, the application server 3100 can execute commands for moving or copying the data between the application servers 3100 to 3100n and/or the storage servers 3200 to 3200m. The data may be moved from the storage devices 3250 to 3250m of the storage servers 3200 to 3200m via the memories 3220 to 3220m of the storage servers 3200 to 3200m, or may be directly moved to the memories 3120 to 3120n of the application servers 3100 to 3100n. Data which moves through the network 3300 may be encrypted for security and privacy.

The storage server 3200 will be described as example. An interface 3254 provides a physical connection between the processor 3210 and a controller 3251, and a physical connection between a NIC 3240 and the controller 3251. For example, the interface 3254 can be implemented as a DAS (Direct Attached Storage) in which the storage device 3250 is directly connected with a dedicated cable. Further, for example, the interface 3254 may be implemented as one of various interface types, such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), an SD (secure digital) card, a MMC (multi-media card), an eMMC (embedded multi-media card), a UFS (Universal Flash Storage), an eUFS (embedded Universal Flash Storage), and/or a CF (compact flash) card interface.

The storage server 3200 further includes a switch 3230 and a NIC 3240. The switch 3230 can selectively connect the processor 3210 and the storage device 3250 or can selectively connect the NIC 3240 and the storage device 3250, according to the control of the processor 3210.

In an embodiment, the NIC 3240 includes one of a network interface card or a network adapter, etc. The NIC 3240 is connected to the network 3300 by at least one of a wired interface, a wireless interface, a Bluetooth interface, an optical interface, etc. The NIC 3240 includes an internal memory, a DSP, a host bus interface, etc., and is connected to the processor 3210 and/or the switch 3230, etc., through the host bus interface. The host bus interface may also be implemented as one of the interface examples 3254 described above. In an embodiment, the NIC 3240 is also integrated with at least one of the processor 3210, the switch 3230, and the storage device 3250.

In an embodiment, a switch 3130 and a NIC 3140 of the application server 3100 may be implemented similarly as the switch 3230 and the NIC 3240 of the storage server 3200.

The processor of the storage serves 3200 to 3200m or the application servers 3100 to 3100n transmits commands to the storage devices 3150 to 3150n and 3250 to 3250m or the memories 3120 to 3120n and 3220 to 3220m to program and/or read the data. The data is error-corrected through an ECC (Error Correction Code) engine. The data is subjected to data bus inversion (DBI) or data masking (DM) process, and may include CRC (Cyclic Redundancy Code) information. The data may be encrypted for security and privacy.

The storage devices 3150 to 3150m and 3250 to 3250m transmit the control signals and command/address signals to the NAND flash memory devices 3252 to 3252m in response to read commands received from the processor. Accordingly, when data is read from the NAND flash memory devices 3252 to 3252m, the RE (Read Enable) signal is input as a data output control signal, and serves to output the data to the DQ bus. A DQS (Data Strobe) is generated using the RE signal. Commands and address signals are latched to the page buffer depending on a rising edge or a falling edge of a WE (Write Enable) signal.

The controller 3251 generally control the operation of the storage device 3250. In an embodiment, the controller 3251 includes a SRAM (Static Random Access Memory). The controller 3251 writes data to the NAND flash 3252 in response to a write command, or reads the data from the NAND flash 3252 in response to a read command. For example, the write command and/or the read command is provided from the processor 3210 in the storage server 3200, a processor 3210m in another storage server 3200m or the processors 3110 and 3110n in the application servers 3100 and 3100n. A DRAM 3253 temporarily stores or buffers the data to be written to the NAND flash 3252 or the data read from the NAND flash 3252. In addition, the DRAM 3253 can store metadata. Metadata is user data or data generated by the controller 3251 to manage the NAND flash 3252. The storage device 3250 may include an SE (Secure Element) for security and privacy.

In some embodiments, the above-mentioned storage device is used as the storage device 3250 of the storage server 3200 to the storage device 3250m of the storage server 3200m.

Although embodiments of the present disclosure have been described with reference to the accompanying drawings, it will be apparent to those skilled in the art that embodiments of the present disclosure can be manufactured in various forms without being limited to the above-described embodiments and can be embodied in other specific forms without departing from the spirit and essential characteristics of the specification. Thus, the above embodiments are to be considered in all respects as illustrative and not restrictive.

What is claimed is:

1. A storage device, comprising:
a non-volatile memory that stores a first original data and a first parity data;
a storage controller that receives a second original data that differs from the first original data from an external storage device, and receives the first parity data from the non-volatile memory; and
a computational engine that receives the second original data and the first parity data from the storage controller, and computes the first parity data and the second original data, and restores a third original data that differs from the first original data and the second original data,
wherein the storage controller receives the third original data from the computational engine and transmits the third original data to a host and the external storage device.

2. The storage device of claim 1, wherein computing the first parity data and the second original data includes an XOR computation.

3. The storage device of claim 1, wherein the first parity data is generated through an XOR computation on a part of original data set including the first original data and the second original data.

4. The storage device of claim 1, wherein the storage controller transmits the third original data simultaneously to the host and the external storage device.

5. The storage device of claim 1, wherein the storage controller does not transmit the first parity data to the host and the external storage device.

6. The storage device of claim 1, wherein the computational engine deletes the second original data and the third original data, after the storage controller transmits the third original data to the host and the external storage device.

7. A storage device, comprising:
a first storage device that stores a first original data of an original data set that includes the first original data to a fourth original data and a first parity data; and
a second storage device that stores the second original data and a second parity data that differs from the first parity data,
wherein the first storage device computes the second original data received from the second storage device and the first parity data, and restores the third original data, and
wherein the second storage device transmits the second original data simultaneously to the first storage device and a host.

8. The storage device of claim 7, wherein computing the first parity data and the second original data includes an XOR computation.

9. The storage device of claim 7, wherein the first parity data and the second parity data are generated through an XOR computation on a part of the original data set.

10. The storage device of claim 7, wherein the first storage device transmits the restored third original data simultaneously to the second storage device and the host.

11. The storage device of claim 10, wherein the first storage device transmits the restored third original data to the second storage device and the host, and deletes the second original data and the third original data.

12. The storage device of claim 7, wherein the second storage device receives the restored third original data from the first storage device, and
computes the second parity data and the third original data and restores the fourth original data from the second parity data and the third original data.

13. The storage device of claim 12, wherein the second storage device transmits the restored fourth original data to the host and deletes the third original data and the fourth original data.

14. The storage device of claim 7, wherein sizes of the first original data to the fourth original data are equal to each other.

15. A host-storage system, comprising:
a host;
a storage device that includes a first storage device that stores a first data and a second storage device that stores a second data; and
a host interface that connects the host and the storage device,
wherein the host transmits a read command to the first storage device and the second storage device,
wherein the first storage device transmits a third data that is at least a part of the first data simultaneously to the host and the second storage device in response to the read command, and wherein the second storage device executes a computation that uses the third data received from the first storage device and the second data.

16. The host-storage system of claim 15, wherein the computation includes an XOR computation.

17. The host-storage system of claim 15, wherein the first data includes a first original data and a first parity data, and
the first storage device transmits only the first original data of the first data to the host and the second storage device.

18. The host-storage system of claim 17, wherein the second data includes a second original data and a second parity data, and
the second storage device computes the first original data received from the first storage device and the second parity data, and restores a third original data that differs from the first original data and the second original data.

19. The host-storage system of claim 18, wherein the second storage device transmits the restored third original data simultaneously to the host and the first storage device.

20. The host-storage system of claim 15, wherein a size of the first data is the same as a size of the second data.

* * * * *